(12) United States Patent
Nakanishi et al.

(10) Patent No.: US 10,421,427 B2
(45) Date of Patent: Sep. 24, 2019

(54) OCCUPANT PROTECTION DEVICE

(71) Applicant: TOYODA GOSEI CO., LTD., Kiyosu-shi, Aichi-ken (JP)

(72) Inventors: Hiroyuki Nakanishi, Kiyosu (JP); Wataru Miura, Kiyosu (JP); Naohiko Ishiguro, Kiyosu (JP); Ryotaro Ishida, Kiyosu (JP)

(73) Assignee: TOYODA GOSEI CO., LTD., Aichi (JP)

( * ) Notice: Subject to any disclaimer, the term of this patent is extended or adjusted under 35 U.S.C. 154(b) by 107 days.

(21) Appl. No.: 15/879,510

(22) Filed: Jan. 25, 2018

(65) Prior Publication Data
US 2018/0222431 A1 Aug. 9, 2018

(30) Foreign Application Priority Data
Feb. 3, 2017 (JP) ................. 2017-018831

(51) Int. Cl.
| | |
|---|---|
| *B60R 21/231* | (2011.01) |
| *B60R 21/26* | (2011.01) |
| *B60R 21/205* | (2011.01) |
| *B60R 21/16* | (2006.01) |
| *B60R 21/2338* | (2011.01) |
| *B60R 21/233* | (2006.01) |

(52) U.S. Cl.
CPC ............ *B60R 21/231* (2013.01); *B60R 21/26* (2013.01); *B60R 21/205* (2013.01); *B60R 2021/161* (2013.01); *B60R 2021/23308* (2013.01); *B60R 2021/23316* (2013.01); *B60R 2021/23382* (2013.01)

(58) Field of Classification Search
CPC ...... B60R 21/231; B60R 21/26; B60R 21/205
See application file for complete search history.

(56) References Cited

U.S. PATENT DOCUMENTS

| | | | |
|---|---|---|---|
| 3,817,552 A | 6/1974 | Knight, IV et al. | |
| 9,446,735 B1 * | 9/2016 | Jayasuriya | ............ B60R 21/232 |
| 9,821,750 B2 * | 11/2017 | Miura | ................... B60R 21/233 |

(Continued)

FOREIGN PATENT DOCUMENTS

| | | |
|---|---|---|
| DE | 202013002020 U1 | 5/2013 |
| DE | 102012006511 A1 | 10/2013 |

(Continued)

*Primary Examiner* — Faye M Fleming
(74) *Attorney, Agent, or Firm* — Posz Law Group, PLC

(57) ABSTRACT

An occupant protection device includes an airbag, covering a front area from a passenger seat to a driver seat at the time of completion of inflation, including: a passenger-seat receiving inflation part; a driver-seat receiving inflation part; an inflow side inflation part; an end-side flow path part disposed so that both ends of the inflow side inflation part in the right and left direction are respectively connected with end edges of the passenger-seat receiving inflation part and the driver-seat receiving inflation part; and a central flow path part disposed so that the inflow side inflation part is connected with a proximity edge part where the passenger-seat receiving inflation part is close to the driver-seat receiving inflation part, wherein the inflow side inflation part is configured so that at least both right and left end sides at the time of completion of inflation are attached in the housing portion.

8 Claims, 22 Drawing Sheets

(56) References Cited

U.S. PATENT DOCUMENTS

| | | |
|---|---|---|
| 2003/0001366 A1 | 1/2003 | Debler et al. |
| 2004/0094939 A1* | 5/2004 | Debler et al. |
| 2018/0354450 A1* | 12/2018 | Yamada ............ B60R 21/23138 |
| 2019/0054889 A1* | 2/2019 | Suemitsu .............. B60R 21/231 |

FOREIGN PATENT DOCUMENTS

| | | | |
|---|---|---|---|
| EP | 1270341 A2 | 1/2003 | |
| EP | 1419941 A2 | 5/2004 | |
| JP | S49-058546 A | 6/1974 | |
| JP | 2011-051513 A | 3/2011 | |
| JP | 2014-218215 A | 11/2014 | |
| JP | 2017065396 A * | 4/2017 | ........... B60R 21/231 |

\* cited by examiner

1

OCCUPANT PROTECTION DEVICE

CROSS-REFERENCE TO RELATED APPLICATIONS

This application is based upon and claims the benefit of priority from Japanese Patent Application No. 2017-018831, filed on Feb. 3, 2017, the entire contents of which are incorporated herein by reference.

BACKGROUND

1. Field of the Invention

The present invention relates to an occupant protection device including an airbag which is housed in a folded state in a housing portion provided in an instrument panel disposed on a front side of a front seat in a vehicle and is inflated by allowing an inflation gas discharged from an inflator to flow therein.

2. Description of the Related Art

In the related art, an occupant protection device is known which can protect a passenger-seat person sifting on a passenger seat and a driver sitting on a driver seat at the same time by using an airbag which is inflated to cover an area on the front side from the passenger seat to the driver seat (for example, JP-A-S49-58546).

In the occupant protection device in the related art, a gas conduit part which is connected with an inflator to guide the inflation gas into the airbag is configured to extend substantially along a right and left direction, so as to be disposed over almost the entire area of the airbag in the right and left direction at the time of completion of inflation, and is configured to inflate the airbag by allowing the inflation gas to flow out from a plurality of outflow holes arranged in the right and left direction into the airbag.

However, the occupant protection device in the related aft is configured such that a bag-shaped airbag is merely inflated toward the front area from the driver seat to the passenger seat, and thus the volume of the airbag is large. Therefore, there is room for improvement to reduce the volume or to complete inflation rapidly.

SUMMARY

The invention is made to solve the above-described problem, and an object thereof is to provide an occupant protection device which can prevent an airbag from increasing in volume and can rapidly and smoothly protect a passenger-seat person and a driver with an airbag inflated completely.

According to an aspect of the invention, there is provided an occupant protection device, including: an airbag which is housed in a folded state in a housing portion provided in an instrument panel disposed on a front side of a front seat in a vehicle and is inflated by allowing an inflation gas discharged from an inflator to flow therein, wherein: the airbag is configured to be disposed to cover a front area from a passenger seat to a driver seat at the time of completion of inflation; the housing portion is arranged over the front area from the passenger seat to the driver seat to house the folded airbag; the airbag includes: a passenger-seat receiving inflation part which is disposed on a front side of the passenger seat and is inflated to receive a passenger-seat person; a driver-seat receiving inflation part which is disposed on a front side of the driver seat and is inflated to receive a driver; an inflow side inflation part which is formed continuously substantially along a right and left direction on a front area from the passenger-seat receiving inflation part to the driver-seat receiving inflation part and is inflated by allowing the inflation gas discharged from the inflator to flow therein; an end-side flow path part which is configured to be disposed substantially along a front and rear direction at the time of completion of inflation so that both ends of the inflow side inflation part in the right and left direction are respectively connected with end edges, which are separated in the right and left direction at the time of completion of inflation, of the passenger-seat receiving inflation part and the driver-seat receiving inflation part, and to support the end edges, which are separated in the right and left direction, of the passenger-seat receiving inflation part and the driver-seat receiving inflation part at the time of completion of inflation by allowing the inflation gas having flowed in the inflow side inflation part to flow out to the passenger-seat receiving inflation part and the driver-seat receiving inflation part; and a central flow path part which is configured to be disposed substantially along the front and rear direction at the time of completion of inflation on the area between the end-side flow path parts so that the inflow side inflation part is connected with a proximity edge part where the passenger-seat receiving inflation part is close to the driver-seat receiving inflation part, and to support the proximity edge parts in the passenger-seat receiving inflation part and the driver-seat receiving inflation part at the time of completion of inflation by allowing the inflation gas having flowed in the inflow side inflation part to flow out to the passenger-seat receiving inflation part and the driver-seat receiving inflation part; and the inflow side inflation part is configured so that at least both right and left end sides at the time of completion of inflation are attached in the housing portion.

In the occupant protection device of the invention, in the airbag, the inflation gas having flowed in the flow-in side inflation part is allowed to flow in the passenger-seat receiving inflation part and the driver-seat receiving inflation part through the two end-side flow path parts which are disposed on the end edges, which are separated in the right and left direction of the passenger-seat receiving inflation part and the driver-seat receiving inflation part, and the central flow path part disposed in the proximity edge parts where the passenger-seat receiving inflation part is close to the driver-seat receiving inflation part, so as to inflate the passenger-seat receiving inflation part and the driver-seat receiving inflation part. For this reason, although the airbag has the passenger-seat receiving inflation part disposed on the front side of the passenger seat and the driver-seat receiving inflation part disposed on the front side of the driver seat and has a shape wide in the right and left direction when completely inflated, the passenger-seat receiving inflation part and the driver-seat receiving inflation part can be inflated rapidly with an excellent balance in the right and left direction. In addition, in the occupant protection device of the invention, the airbag is configured such that both right and left ends in the flow-in side inflation part at the time of completion of inflation are attached in the housing portion. Thus, although the flow-in side inflation part is disposed continuously substantially along the right and left direction to extend over the front area from the passenger seat to the driver seat, in other words, is disposed in a rod shape substantially along the right and left direction at the time of completion of inflation, the flow-in side inflation part can be disposed to prevent the floating-up of the both right and left end sides. Further, in the airbag at the time of completion of inflation, the end-side flow path parts connect the both right and left end sides of the flow-in side inflation part with the end edges, which are separated in the right and left direction, of the passenger-seat receiving inflation part and the driver-seat receiving inflation part, respectively, so as to support the end edges, which are separated in the right and left direction, of the passenger-seat receiving inflation part and the driver-seat receiving inflation part. The central flow path part supports the proximity edge parts where the passenger-seat receiving inflation part is close to the driver-seat receiving inflation part. For this reason, in the passenger-seat receiving inflation part and the driver-seat receiving inflation part, at the time of completion of inflation of the airbag, both right and left edges are supported by the end-side flow path parts and the central flow path part which are inflated in a rod shape substantially along the front and rear direction, respectively. The passenger-seat person and the driver moving forward can be protected smoothly by the passenger-seat receiving inflation part and the driver-seat receiving inflation part in which the right and left sides are supported.

Therefore, in the occupant protection device of the invention, the increase in volume of the airbag can be prevented, and the passenger-seat person and the driver can be protected rapidly and smoothly by the airbag inflated completely.

In the occupant protection device of the invention, the airbag is arranged with an opening part which is formed to be penetrated in the vertical direction such that the steering arranged on the front side of the driver seat at the time of completion of inflation can be inserted therethrough. Thus, it can be prevented that the inflating airbag interferes with the steering wheel while the airbag is deployed and inflated, and the airbag can be inflated more rapidly and smoothly, which is preferable.

In the above-configured occupant protection device, on the front side of the passenger-seat receiving inflation part, the airbag is arranged with a non-inflation area which does not allow the inflation gas to flow therein in the area between the end-side flow path part and the central flow path part. Thus, it is possible to reduce the volume of the airbag, which is preferable.

In the above-configured occupant protection device, the passenger-seat receiving inflation part and the driver-seat receiving inflation part are configured such that the rear surfaces at the time of completion of inflation are connected continuously in the right and left direction. Thus, during the oblique collision of the vehicle or the offset collision, in a case where the passenger-seat person or the driver moves obliquely to the front side as the central side in the right and left direction, the passenger-seat person or the driver which moves obliquely to the front side can be accurately protected by the portion between the passenger-seat receiving inflation part and the driver-seat receiving inflation part, which is preferable.

The passenger-seat receiving inflation part and the driver-seat receiving inflation part are configured such that the inflation area which is inflated by allowing the inflation gas to flow therein is continuous in the right and left direction. Thus, the passenger-seat person or the driver which moves obliquely to the front side can be protected with good cushioning performance and can be protected more accurately, which is preferable.

In the above-configured occupant protection device, a protrusion inflation part which is disposed to protrude rearward at the time of completion of inflation may be arranged between the passenger-seat receiving inflation part and the driver-seat receiving inflation part. Even in such a configuration, the passenger-seat person or the driver which moves obliquely to the front side as the central side in the right and left direction can be protected accurately by the protrusion inflation part, which is preferable.

In the above-configured occupant protection device, the inflator is arranged on the both right and left end sides of the flow-in side inflation part at the time of completion of inflation.

The flow-in side inflation part is attached in the housing portion by using the two inflators, which is preferable.

When the occupant protection device is configured as above, an attachment member for attaching the flow-in side inflation park in the housing portion also can be used as an attachment member for attaching the inflator in the housing portion. Therefore, it can be prevented that the number of the components or the number of the attaching processes is increased, in addition, although the airbag is configured to be wide in the right and left direction to cover the front area from the passenger seat to the driver seat, the airbag can be inflated rapidly with an excellent balance in the right and left direction by arranging the inflators at two places on the both right and left end sides.

In the above-configured occupant protection device, the inflator is configured as a disc type.

The flow-in side inflation part has, an attachment opening through which the inflator is insertable in the lower wall part disposed on a lower surface at the time of completion of inflation, and a circumferential edge of the attachment opening is attached in the housing portion by using a retainer which fixes the inflator in the housing portion, which is preferable.

When the occupant protection device is configured as above, the circumferential edge of the attachment opening formed in the flow-in side inflation part is pressed in a form of plane by using the retainer which fixes the inflator in the housing portion, and thus, the flow-in side inflation part can be attached in the housing portion. Compared to a case where a cylinder-type inflator is used, the flow-in side inflation part can be attached in the housing portion over a wider surface, which is preferable.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
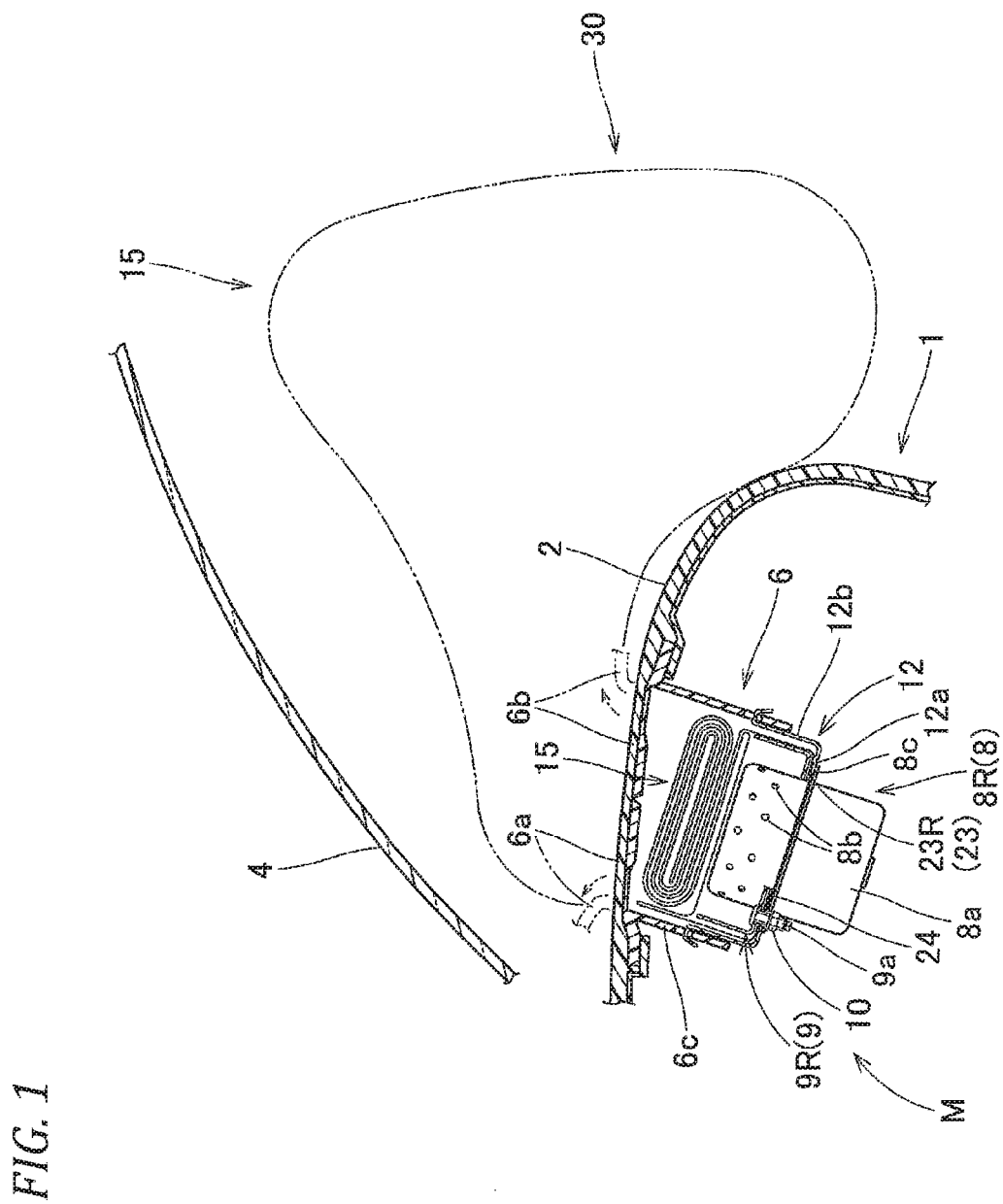
FIG. 1 is a schematic longitudinal sectional view illustrating a state where an occupant protection device according to one embodiment of the invention is mounted in a vehicle.
Figure 2:
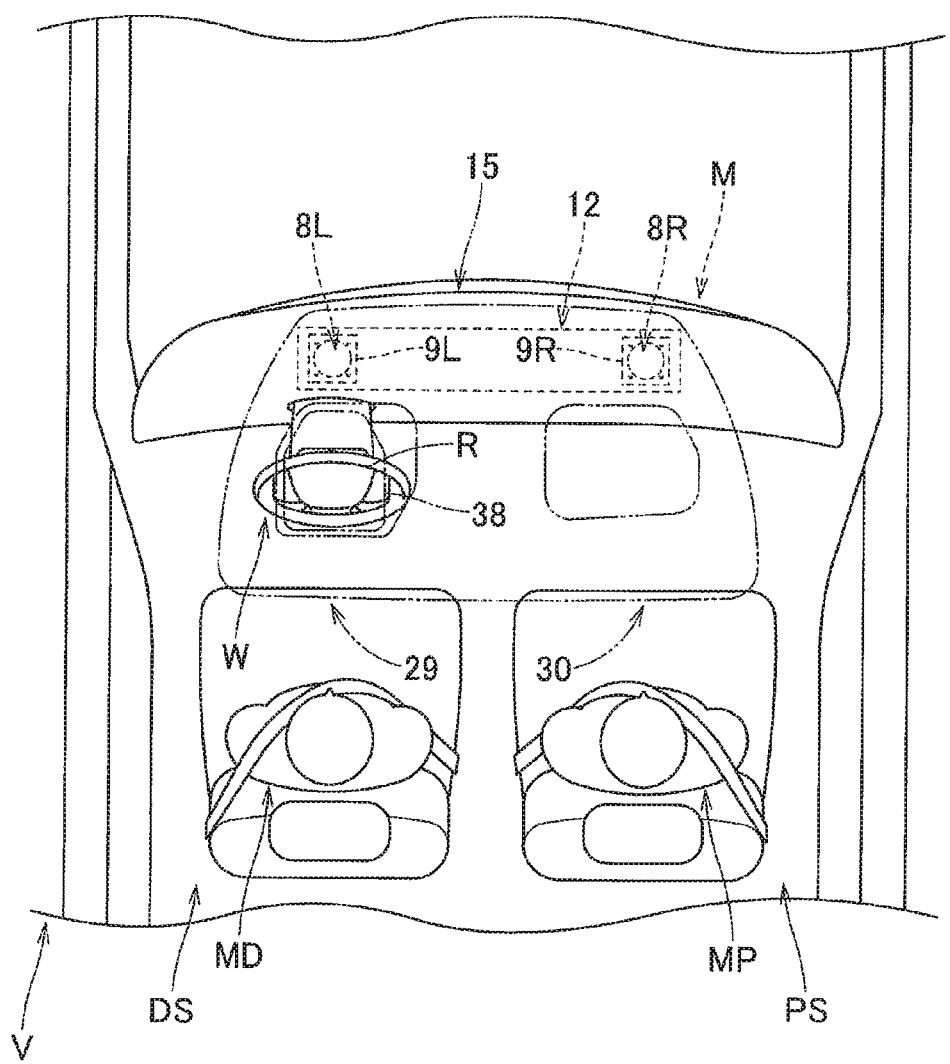
FIG. 2 is a schematic plan view illustrating a state where the occupant protection device according to the embodiment is mounted in the vehicle.

Hereinafter, one embodiment of the invention will be described on the basis of the drawings. As illustrated in FIGS. 1 and 2, an occupant protection device M of the embodiment is provided inside an instrument panel (hereinafter, referred to as an "instrument panel") 1 disposed on a front side of a front seat (a driver seat DS, a passenger seat PS) in a vehicle V. In the case of the embodiment, the occupant protection device M is a top-attached type of being disposed inside the upper surface 2 of the instrument panel 1. Incidentally, in the embodiment, a front and rear direction, an upper and lower direction, and a right and left direction match a front and rear direction, an upper and lower direction, and a right and left direction of the vehicle V unless especially indicated. In addition, the vehicle V in which the occupant protection device M of the embodiment is mounted is a left handle vehicle in which the driver seat DS is disposed on the left side.

As illustrated in FIGS. 1 and 2, the occupant protection device M of the embodiment includes a folded airbag 15, two inflators 8 (8L, 8R) which supply the inflation gas to the airbag 15, a case 12 as a housing portion which houses and holds the airbag 15 and the inflators 8 (8L, 8R), two retainers 9 (9L, 9R) for attaching the airbag 15 and the inflators 8 (8L, 8R) in the case 12, and an airbag cover 6 which covers the upper side of the folded airbag 15.

The airbag cover 6 is formed integrally with the synthetic resin instrument panel 1, and two front and rear door parts 6a and 6b are configured to be pressed and opened by the airbag 15 when the airbag 15 is deployed and inflated. In addition, a connection wall part 6c connected in the case 12 is formed near the door parts 6a and 6b in the airbag cover 6.

Figure 5:
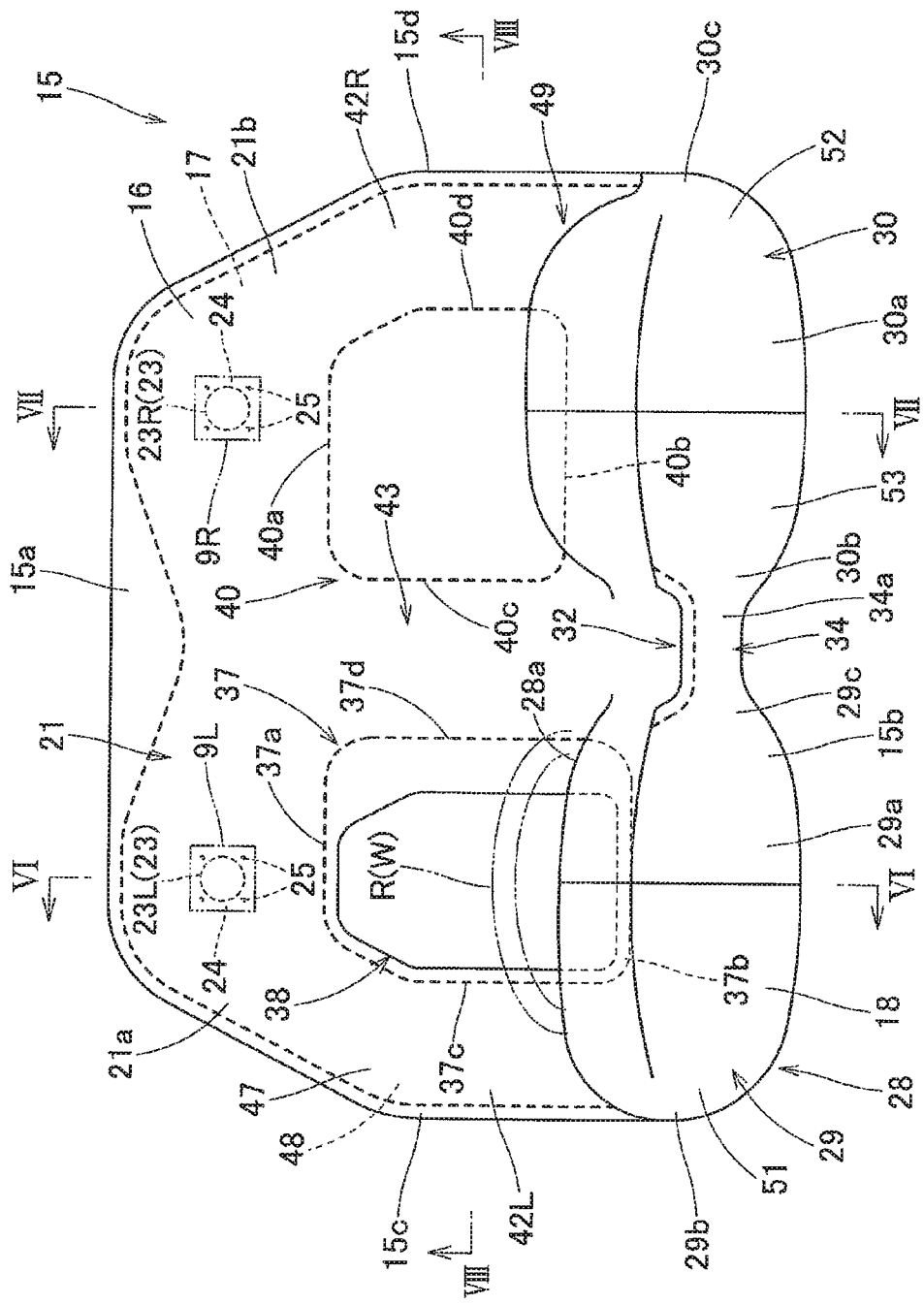
FIG. 5 is a plan view illustrating a state where the airbag of FIG. 3 is inflated in a single piece.
Figure 12:
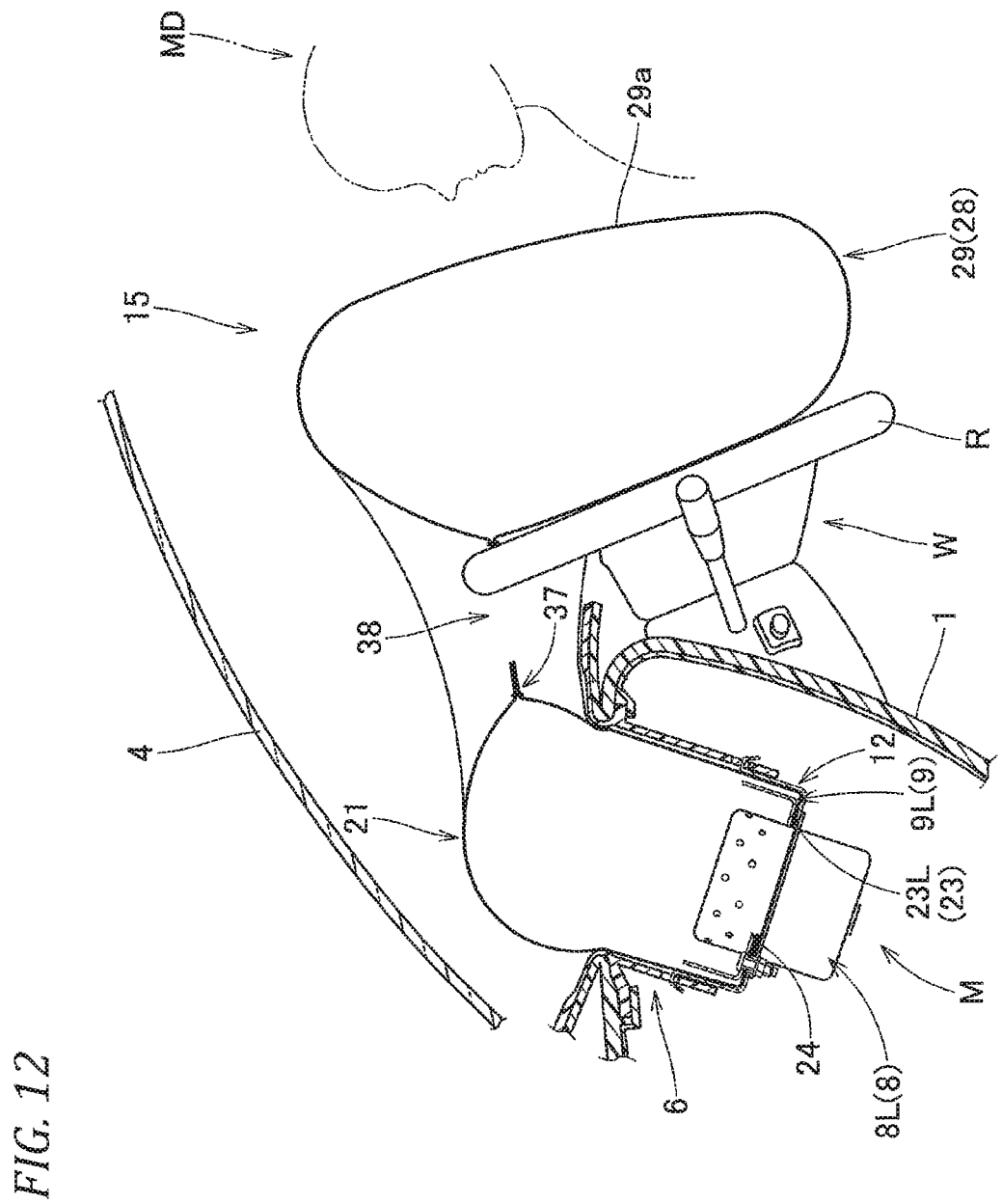
FIG. 12 is a schematic longitudinal sectional view illustrating a front portion of a driver seat in a state where the airbag is inflated completely in the occupant protection device of the embodiment.
Figure 13:
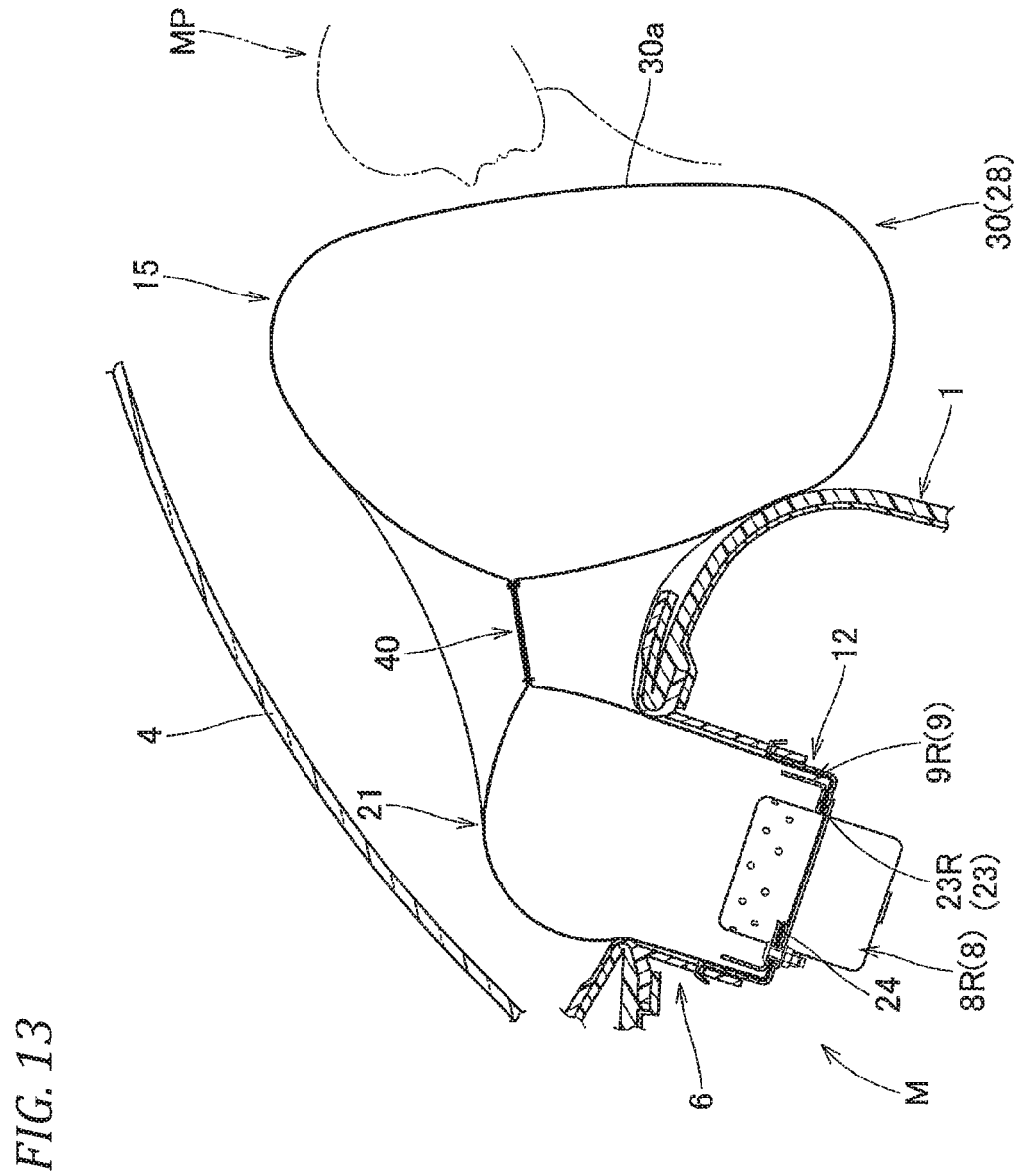
FIG. 13 is a schematic longitudinal sectional view illustrating a front portion of a passenger seat in a state where the airbag is inflated completely in the occupant protection device of the embodiment.

In the case of the embodiment, as illustrated in FIGS. 2 and 5, two inflators 8L and 8R are provided parallel to each other in the right and left direction to be positioned on both right and left end sides of an inflow side inflation part 21 (to be illustrated) of the airbag 15. The two inflators 8L and 8R are formed as a disc type having the same output and have the same outer shape. As illustrated in FIGS. 1, 12, and 13, the inflator 8 (8L, 8R) includes an almost cylindrical main body part 8a having a plurality of gas discharge outlets 8b, and a flange part 8c for attaching the inflator 8 in the case 12. In the case of the embodiment, the inflator 8 (8L, 8R) is configured to be operated during a front collision, an oblique collision, and an offset collision of the vehicle V.

The case 12 as a housing portion is arranged in the front area from the passenger seat PS to the driver seat DS to house the folded airbag 15 (see FIG. 2). Specifically, the case 12 is configured to have a long shape that is disposed substantially along the right and left direction, such that the width dimension in the right and left direction is set to be smaller than that of the area from the left edge of the left driver seat DS to the right edge of the right passenger seat PS in the vehicle V. The case 12 is formed in an almost long rectangular parallelepiped shape which has an opening on the upper end side and is made of a sheet metal. As illustrated in FIG. 1, the case 12 includes a long bottom wall part 12a in which the inflator 8 is inserted from below to be attached, and a circumferential wall part 12b which extends upward from the outer circumferential edge of the bottom wall part 12a to lock the connection wall part 6c of the airbag cover 6. The airbag 15 and the inflator 8 (8L, 8R) penetrate a circumferential edge portion 24 (attachment hole 25) of an attachment opening 23 (23L, 23R) (to be illustrated), the bottom wall part 12a of the case 12, and the flange part 8c of the inflator 8 (8L, 8R), and are fastened by a nut 10 in the airbag 15 to be attached in the bottom wall part 12a of the case 12 by using bolts 9a of the retainer 9 (9L, 9R) disposed in the airbag 15 as a attaching unit (see FIGS. 1, 12, and 13). Incidentally, a bracket (not illustrated) connected on the body side of the vehicle V is arranged in the bottom wall part 12a of the case 12.

Figure 3:
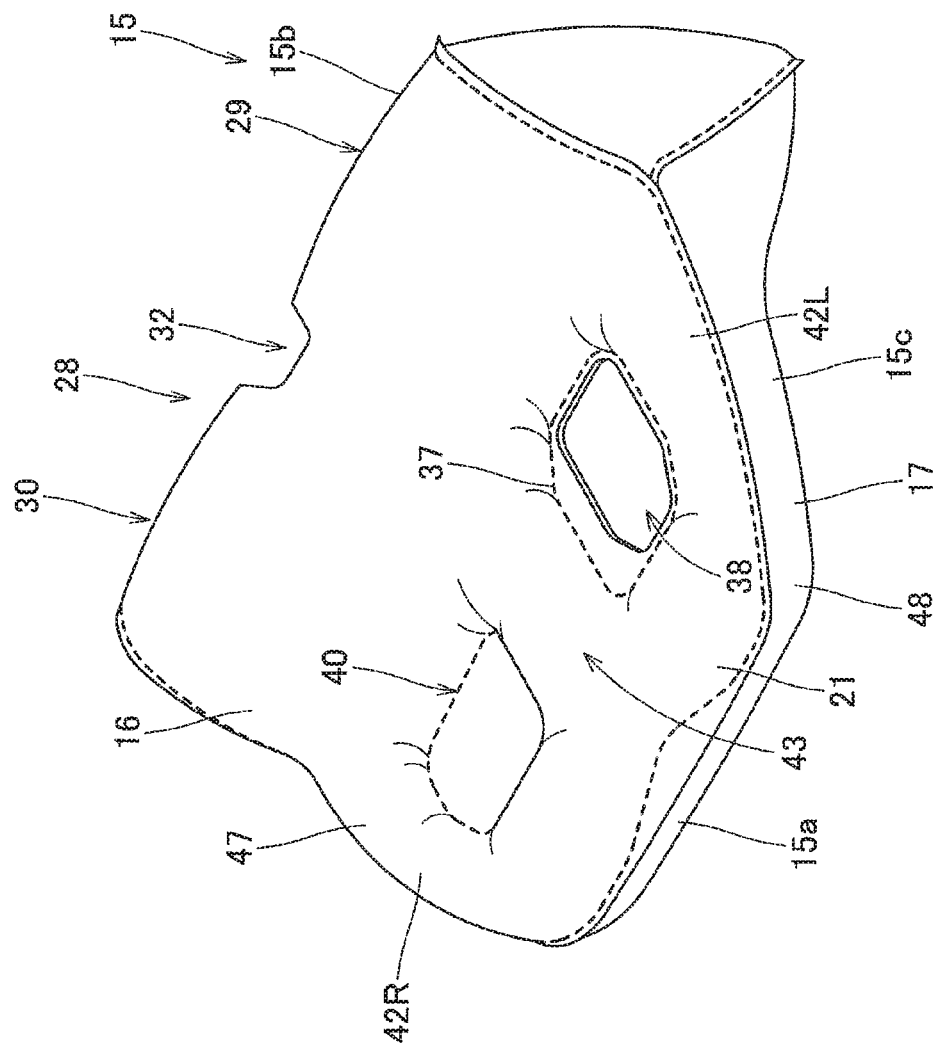
FIG. 3 is a perspective view illustrating a state where an airbag used in the occupant protection device according to the embodiment is inflated in a single piece when viewed from a front left side.
Figure 4:
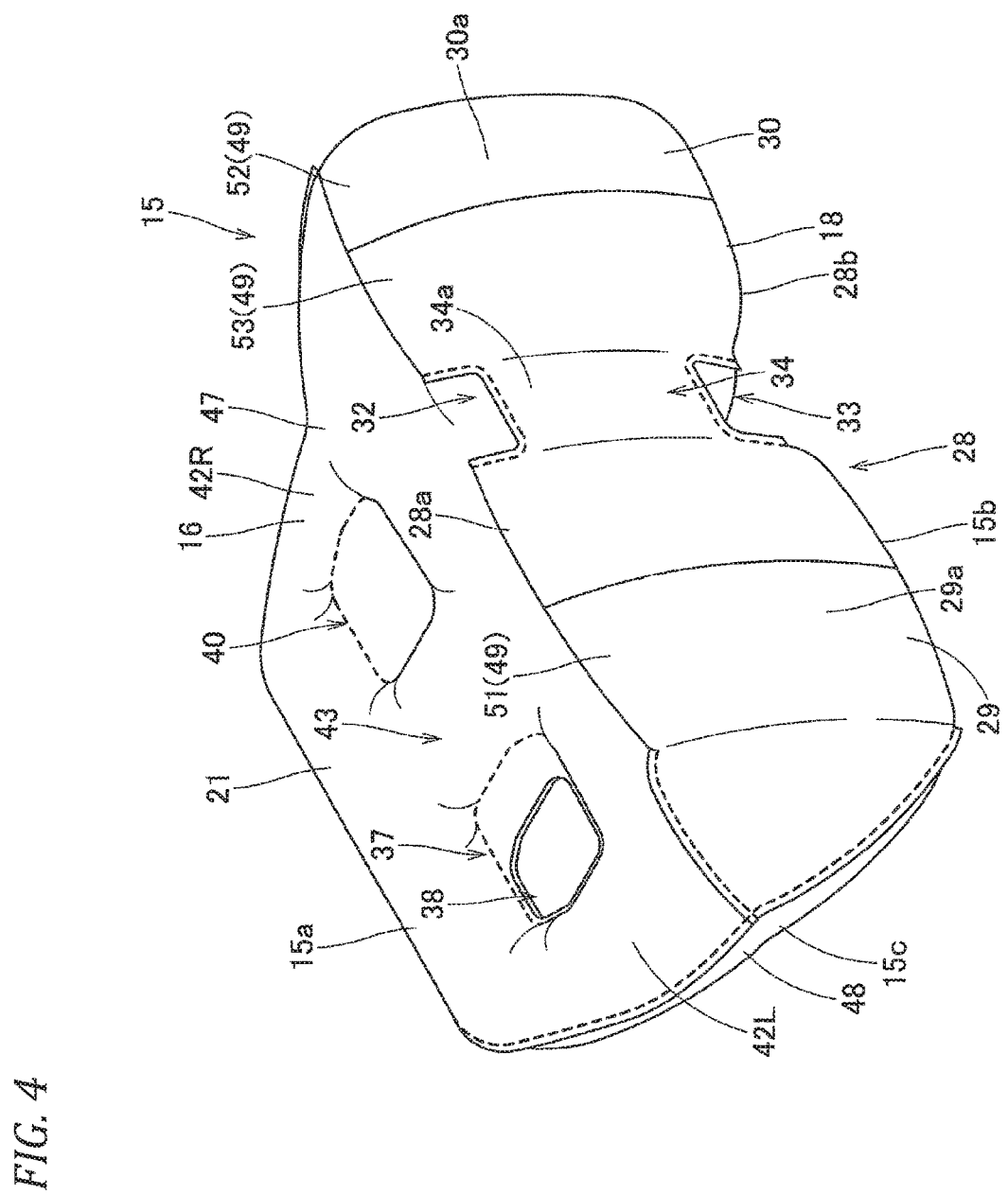
FIG. 4 is a perspective view illustrating a state where the airbag of FIG. 3 is inflated in a single piece when viewed from a rear right side.

The airbag 15 has a bag shape which is formed from a sheet body having flexibility. As illustrated in FIGS. 3 to 5, a completely inflated shape when viewed from a vertical direction is formed as an almost rectangular shape, and the area on the rear end side at the time of completion of inflation is vertically wide toward the rear end side. In the airbag 15, a front end 15a at the time of completion of inflation is attached on the case 12 side. The airbag 15 is disposed to be deployed and inflated by allowing the inflation gas discharged from the inflator 8 to flow therein while protruding from the case 12 toward the upper rear side, and to cover the front area from the passenger seat PS to the driver seat DS at the time of completion of inflation as illustrated by a two-dot chain line of FIG. 2 and in FIG. 11.

As illustrated in FIGS. 3 to 8, in the airbag 15, the completely inflated shape is an almost triangular prism shape extending substantially along the right and left direction such that the front area is formed as an almost rectangular plate shape, and the rear area is formed to be vertically wide toward the rear end 15b side. The airbag 15 includes an upper wall part 16 disposed on a windshield 4 side at the time of completion of inflation, a lower wall part 17 disposed on the instrument panel 1 side, and a rear wall part 18 disposed on an occupant (the driver MD and the passenger-seat person MP) side. In addition, the airbag 15 includes the inflow side inflation part 21 which is disposed on the front end 15a side at the time of completion of inflation to be attached on the case 12 side, an occupant protection part 28 disposed on the rear end 15b side at the time of completion of inflation, and end-side flow path parts 42L and 42R and a central flow path part 43 which are disposed in the area between the inflow side inflation part 21 and the occupant protection part 28. Specifically, in the airbag 15, in the flatly-deployed state, the front area of the end-side flow path parts 42L and 42R from the approximate center in the front and rear direction to the inflow side inflation part 21 is configured to be slightly narrow toward the front edge side such that the left edge 15c and the right edge 15d are tilted toward the front end 15a (see FIG. 9).

The inflow side inflation part 21 is formed on the front end 15a side of the airbag 15 continuously substantially along the right and left direction. The outer shape at the time of completion of inflation is configured as an almost rod shape of which an axial direction is disposed substantially along the right and left direction. The inflow side inflation part 21 is configured such that the width dimension in the right and left direction at the time of completion of inflation substantially matches the width dimension of the occupant protection part 28 in the right and left direction at the time of completion of inflation, and specifically is slightly narrow compared to the width dimension of the occupant protection part 28 in the right and left direction. In the inflow side inflation part 21, a left end 21a side and a right end 21b side are attached in the case 12. In the case of the embodiment, the lower surface (lower wall part 17) of the left end 21a and the right end 21b is opened in an almost circular shape such that the inflation gas can flow therein, and is arranged with the attachment opening 23 (23L, 23R) of which the circumferential edge is attached in the bottom wall part 12a of the case 12 by using the retainer 9 (9L, 9R). Specifically, the attachment opening 23 is in the vicinity of the left end 21a and the right end 21b of the inflow side inflation part 21, and is formed in the front area of a left coupling portion 37 and a right coupling portion 40 (to be illustrated). In other words, the attachment opening 23 (23L, 23R) is formed in the front area between each of the end-side flow path parts 42L and 42R and the central flow path part 43. The attachment opening 23 is formed to be open in an almost circular shape having the inner diameter dimension that can insert the main body part 8a of the inflator 8. The circumferential edge is arranged with a plurality (four in the case of the embodiment) of the attachment holes 25 for attaching the circumferential edge portion 24 in the bottom wall part 12a of the case 12 by inserting the bolt 9a of the retainer 9 (9L, 9R).

The occupant protection part 28 is disposed in the area from the front side of the passenger seat PS to the front side of the driver seat DS at the time of completion of inflation. In the case of the embodiment, the inflation area which is inflated by allowing the inflation gas to flow therein is configured to be continuous in the right and left direction. Specifically, the occupant protection part 28 includes a driver-seat receiving inflation part 29 which is disposed on the front side of the driver seat DS on the left side at the time of completion of inflation and is inflated to protect the driver MD, a passenger-seat receiving inflation part 30 which is disposed on the front side of the passenger seat PS on the right side at the time of completion of inflation and is inflated to protect the passenger-seat person MP, and a communication part 34 which is inflated to make the driver-seat receiving inflation part 29 and the passenger-seat receiving inflation part 30 communicate with each other.

Figure 9:
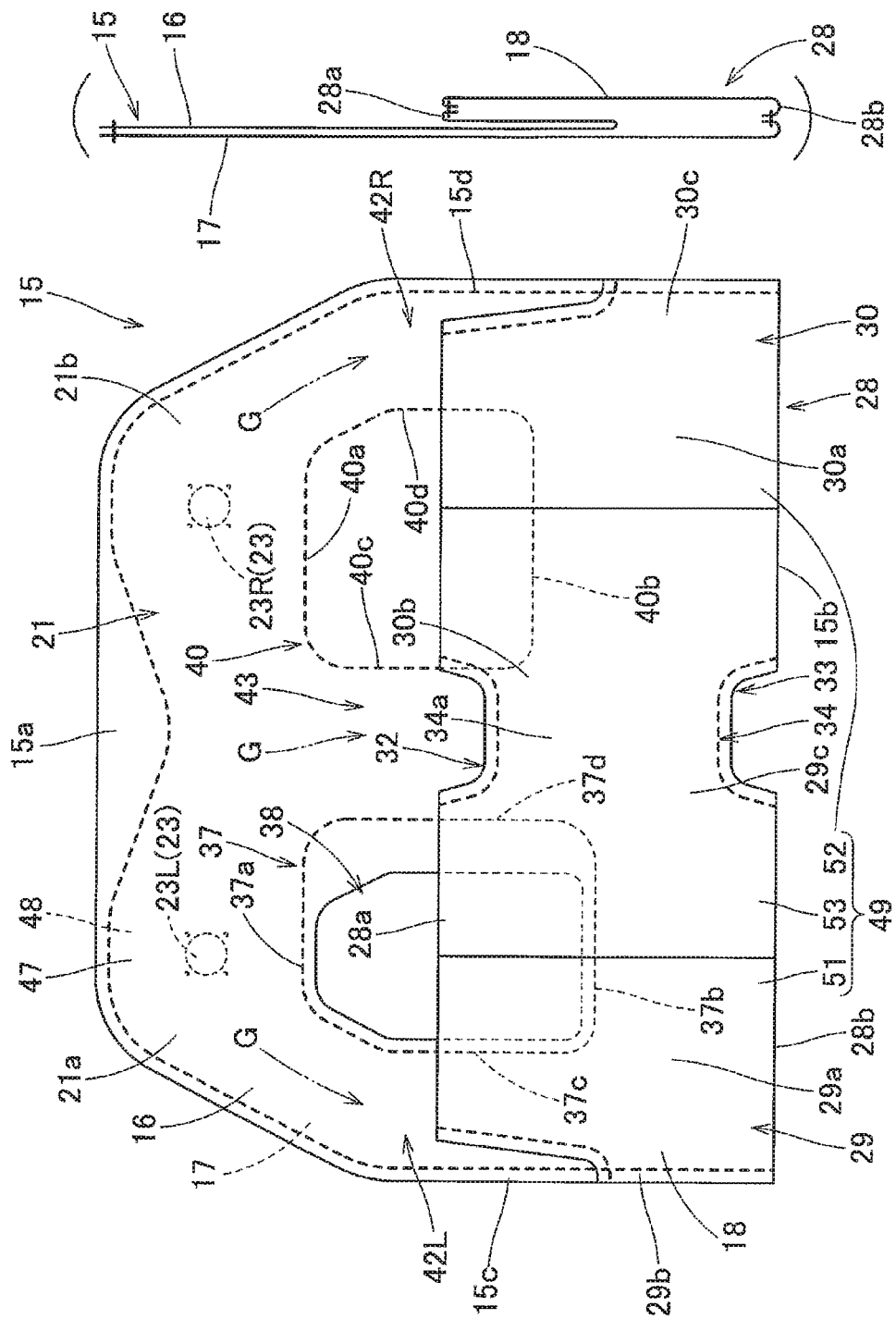
FIG. 9 is a plan view illustrating a state where the airbag of FIG. 3 is flatly deployed.

The driver-seat receiving inflation part 29 is disposed to cover almost the entire surface of the upper surface (rear surface) of a steering wheel W at the time of completion of inflation when the steering wheel W disposed on the front side of the driver seat DS is inserted into an opening part 38 (to be illustrated) disposed on the front side (see FIG. 12). The passenger-seat receiving inflation part 30 is configured such that the front lower surface side is brought close to the instrument panel 1 at the time of completion of inflation to be disposed on the front side of the passenger seat PS (see FIG. 13). As illustrated in FIGS. 4 and 5, in the driver-seat receiving inflation part 29 and the passenger-seat receiving inflation part 30, the rear surfaces 29a and 30a (rear wall part 18) are disposed almost along a vertical direction to nearly flush with each other at the time of completion of inflation. In addition, the passenger-seat receiving inflation part 30 is configured such that the width dimension in the front and rear direction at the time of completion of inflation is set to be larger than that of the driver-seat receiving inflation part 29 which is disposed to cover the steering wheel W protruding from the instrument panel 1 at the time of completion of inflation (see FIGS. 6 and 7), and the front lower s at the time of completion of inflation is disposed to be brought close to the instrument panel 1. Specifically, as illustrated in FIG. 9, a rear edge 40b of the right coupling portion 40 which is formed on the front side of the passenger-seat receiving inflation part 30 is disposed on the front side from the rear edge 37b of the left coupling portion 37 configuring the circumferential edge of the opening part 38 formed on the front side of the driver-seat receiving inflation part 29, and in the passenger-seat receiving inflation part 30, the width dimension in the front and rear direction at the time of completion of inflation is set to be larger than that of the driver-seat receiving inflation part 29.

As illustrated in FIG. 5, in the occupant protection part 28 of the embodiment, an upper recess part 32 and an lower recess part 33, which are recessed on an upper edge 28a side and the lower edge 28b side respectively, are formed in the area between the driver-seat receiving inflation part 29 and the passenger-seat receiving inflation part 30. The upper recess part 32 and the lower recess part 33 are arranged to detour a protrusion which is disposed in the area around the instrument panel I in the vehicle cabin, for example, to detour a member such as a rearview mirror (not illustrated) protruding downward from a roof (not illustrated) and a shift lever (not illustrated) protruding rearward from the instrument panel 1. Further, in the occupant protection part 28 of the embodiment, the communication part 34 is configured such that the upper recess part 32 and the lower recess part 33 are disposed vertically, and the rear surface 34a at the time of completion of inflation is configured to be positioned on the front side from the rear surfaces 29a and 30a of the driver-seat receiving inflation part 29 and the passenger-seat receiving inflation part 30. That is, in the airbag 15 of the embodiment, the rear surface 34a of the continuous area is positioned slightly on the front side, and the passenger-seat receiving inflation part 30 and the driver-seat receiving inflation part 29 are configured such that the rear surfaces 29a and 30a at the time of completion of inflation are connected continuously in the right and left direction through the rear surface 34a of the communication part 34 (see FIG. 5).

Figure 6:
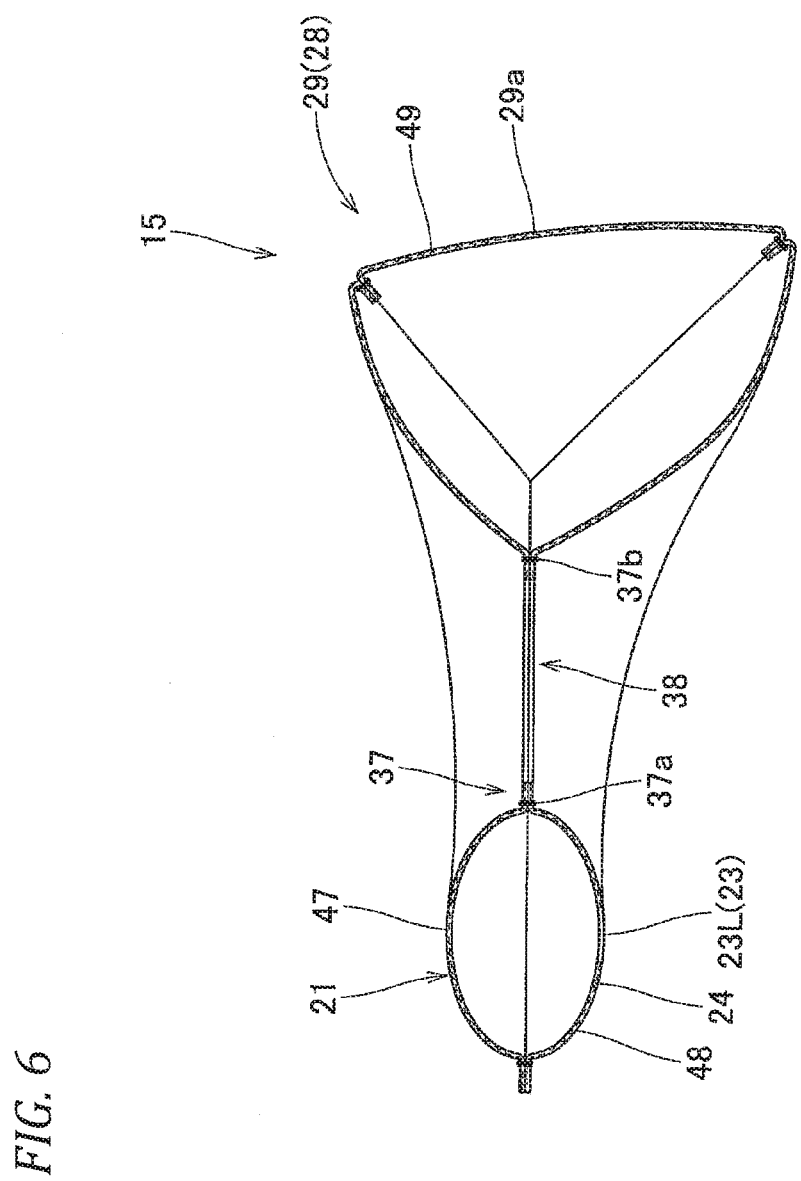
FIG. 6 is a schematic longitudinal sectional view illustrating the airbag of FIG. 5, and is a view illustrating portion VI-VI of FIG. 5.
Figure 7:
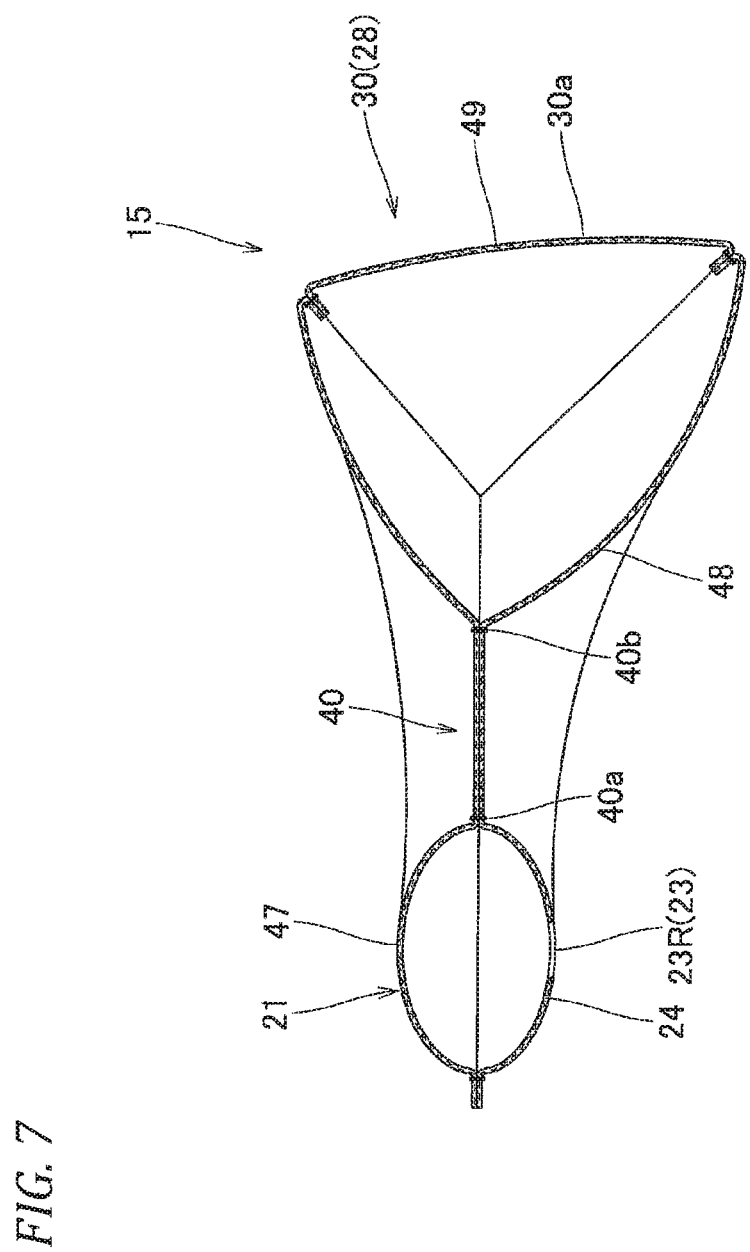
FIG. 7 is a schematic longitudinal sectional view illustrating the airbag of FIG. 5, and is a view illustrating portion VII-VII of FIG. 5.

As illustrated in FIGS. 5 and 6, in the airbag 15 of the embodiment, in a front position of the driver-seal receiving inflation part 29, the left coupling portion 37 which is formed by coupling (sewing) the upper wall part 16 and the lower wall part 17 is formed between the driver-seat receiving inflation part 29 and the inflow side inflation part 21. In the area on the left side from the center of the airbag 15 in the right and left direction, the left coupling portion 37 is formed to have a gap from the left edge 15c of the airbag 15. The left coupling portion 37 has an outer shape in which the width dimension in the front and rear direction is set to be slightly large, and has an almost rectangular shape in which the corner part is chamfered. In addition, the right edge 37d of the left coupling portion 37 is configured such that the rear area is tilted with respect to the front and rear direction to be directed leftward to the rear edge. Further, the upper wall part 16 and the lower wall part 17 are cut in the area surrounded by the left coupling portion 37, and the opening part 38 is formed to be penetrated in the vertical direction. As illustrated in FIGS. 5 and 7, the opening part 38 is configured to be open in the almost rectangular shape, so as to be inserted into a ring part R of the steering wheel W arranged on the front side of the driver seat DS. In the airbag 15 of the embodiment, the portion on the upper end side in the ring part R of the steering wheel W is configured to protrude from the opening part 38 at the time of completion of inflation. The opening part 38 is set such that the opening width dimension in the right and left direction is smaller than the outer diameter dimension of the ring part R in the steering wheel W.

In the front position of the passenger-seat receiving inflation part 30, as illustrated in FIGS. 5 and 7, the right coupling portion 40 (non-inflation area which is formed by coupling (sewing) the upper wall part 16 and the lower wall part 17 is formed also between the passenger-seat receiving inflation part 30 and the inflow side inflation part 21. In the area on the right side from the center of the airbag 15 in the right and left direction, the right coupling portion 40 is formed to have a gap from the right edge 15d of the airbag 15. The right coupling portion 40 has an outer shape in which the width dimension in the right and left direction is set to be large, and has an almost rectangular shape in which the corner part is chamfered. In the right coupling portion 40, the width dimension in the right and left direction is set to be larger than that of the left coupling portion 37, and the width dimension in the front and rear direction is set to be smaller than that of the left coupling portion 37. Further, in the right coupling portion 40 and the left coupling portion 37, front edges 37a and 40a are disposed to match each other in the right and left direction. As described above, the rear edge 40b of the right coupling portion 40 is disposed in the front position from the rear edge 37b of the left coupling portion 37.

Figure 8:
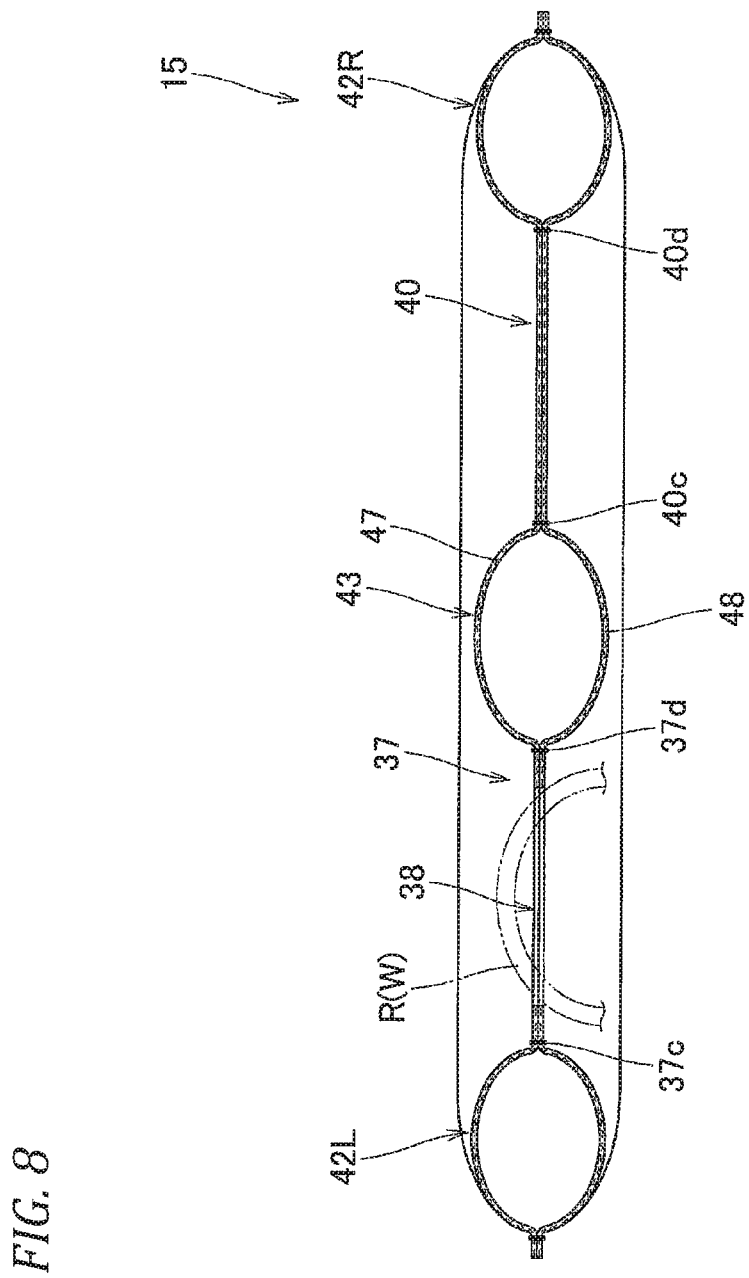
FIG. 8 is a schematic longitudinal sectional view illustrating the airbag of FIG. 5, and is a view illustrating portion VIII-VIII of FIG. 5.

Further, in the airbag 15 of the embodiment, as illustrated in FIG. 8, the area between the left edge 15c of the airbag 15 and the left edge 37c of the left coupling portion 37 configures the end-side flow path part 42L disposed on the left side. The area between the right edge 15d and the right edge 40d of the right coupling portion 40 configures the end-side flow path part 42R disposed on the right side. The area between the right edge 37d of the left coupling portion 37 and the left edge 40c of the right coupling portion 40 configures the central flow path part 43.

As illustrated in FIG. 5, the end-side flow path part 42L disposed on the left side is configured to be disposed substantially along the front and rear direction at the time of completion of inflation, so as to connect the left end 21a. of the inflow side inflation part 21 and an end edge (a left edge 29b in the case of the embodiment) which is separated from the passenger-seat receiving inflation part 30 in the driver-seat receiving inflation part 29 at the time of completion of inflation in the right and left direction. The end-side flow path part 42R disposed on the right side is configured to be disposed substantially along the front and rear direction at the time of completion of inflation, so as to connect the right end 21b of the inflow side inflation part 21 and an end edge (a right edge 30c in the case of the embodiment) which is the separated from driver-seat receiving inflation part 29 in the passenger-seat receiving inflation part 30 at the time of completion of inflation in the right and left direction. In the end-side flow path parts 42L, and 42R, the completely inflated shape is configured as a rod shape extending substantially along the front and rear direction. In the case of the embodiment, the width dimensions in the right and left direction are configured to almost match each other. The end-side flow path parts 42L and 42R are configured to support the right edge 30c of the passenger-seat receiving inflation part 30 and the left edge 29b of the driver-seat receiving inflation part 29 at the time of completion of inflation by allowing the inflation gas G having flowed in the inflow side inflation part 21 to flow out into the passenger-seat receiving inflation part 30 and the driver-seat receiving inflation part 29, respectively.

In the area between the end-side flow path parts 42L and 42R, the central flow path part 43 is configured to be disposed substantially along the front and rear direction at the time of completion of inflation, so as to connect the inflow side inflation part 21 and the proximity edge parts (the right edge 29c of the driver-seat receiving inflation part 29 and the left edge 30b of the passenger-seat receiving inflation part 30) where the passenger-seat receiving inflation part 30 is close to the driver-seat receiving inflation part 29. In the central flow path part 43, the completely inflated shape is configured as a rod shape extending substantially along the front and rear direction. In the case of the embodiment, the width dimension in the right and left direction is set to be slightly larger than the end-side flow path parts 42L and 42R. Further, the central flow path part 43 is configured to support the right edge 29c of the driver-seat receiving inflation part 29 and the left edge 30b of the passenger-seat receiving inflation part 30 at the time of completion of inflation by allowing the inflation gas G having flowed into the inflow side inflation part 21 to flow out into the passenger-seat receiving inflation part 30 and the driver-seat receiving inflation part 29.

Figure 10:
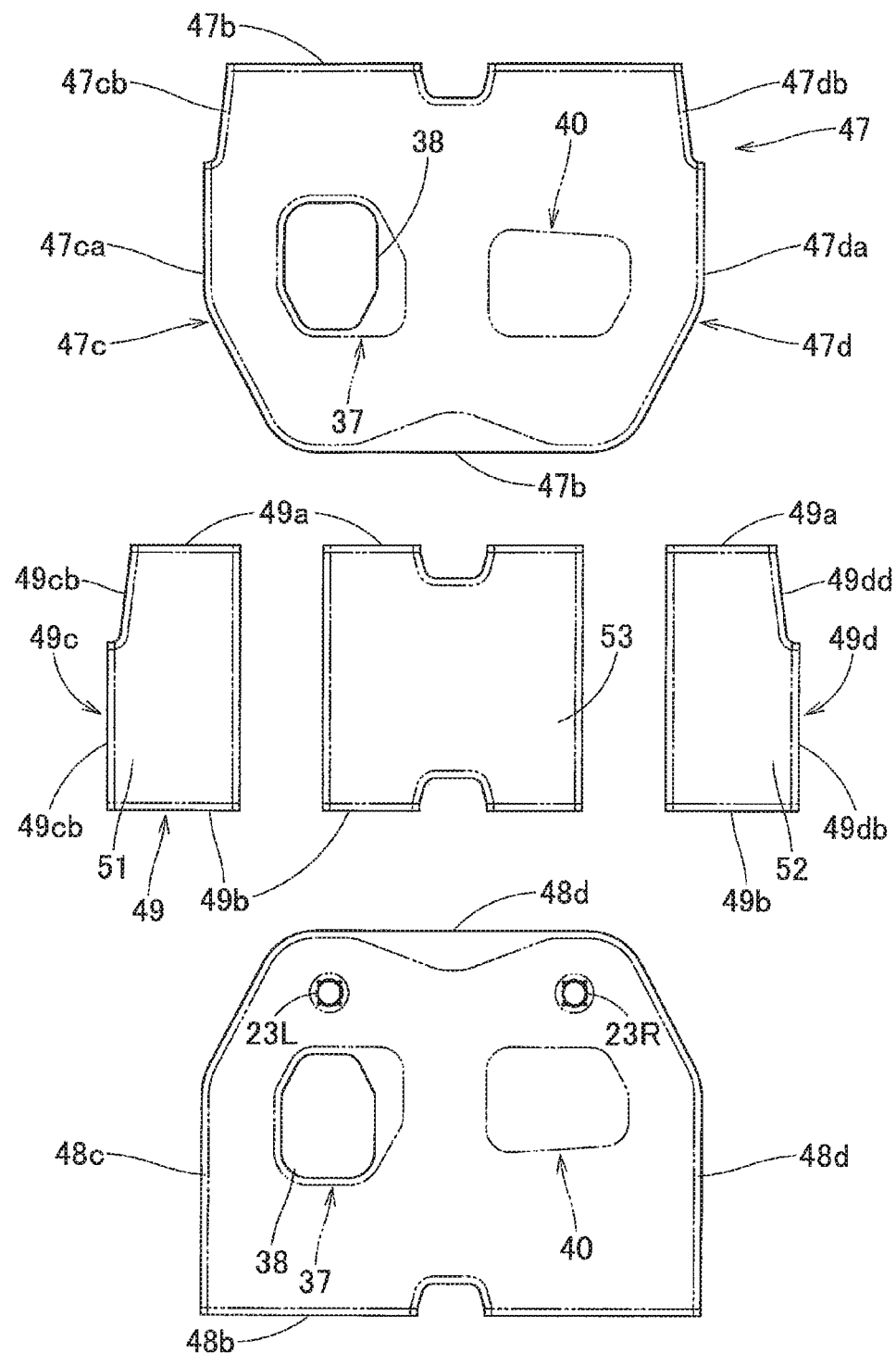
FIG. 10 is a plan view illustrating a base material configuring the airbag of FIG. 3.

The airbag 15 is configured in a bag-shaped by coupling basic-fabric circumferential edges having a predetermined shape. In the case of the embodiment, as illustrated in FIG. 10, the airbag 15 includes an upper panel 47 which is disposed on the upper side at the time of completion of inflation to configure the upper wall part 16, a lower panel 48 which is disposed on the lower side at the time of completion of inflation to configure the lower wall part 17, and a rear panel 49 which is disposed on the rear side at the time of completion of inflation to configure the rear wall part 18.

The upper panel 47 and the lower panel 48 are configured such that the outer shapes are similarly an almost rectangular shape. A notch part (a reference numeral is not provided) configuring the opening part 38 and the upper recess part 32 is formed in the upper panel 47, and a notch part reference numeral is not provided) configuring the opening part 38 and the lower recess part 33 is formed in the lower panel 48. Specifically, the lower panel 48 is configured such that the width dimension in the right and left direction is constant toward the rear edge 48b. However, the upper panel 47 is configured such that the rear area which is coupled with the upper area of the rear panel 49 is formed to be slightly narrow compared to the front area, and a rear part 47cb of a left edge 47c and a rear part 47db of a right edge 47d are disposed on the inside in the right and left direction with respect to front parts 47ca and 47da of the left edge 47c and the right edge 47d.

The rear panel 49 has an almost rectangular outer shape, and is three-divided in the right and left direction in the case of the embodiment. The rear panel 49 is configured by sewing (coupling) adjacent edge parts between a left portion 51 and a right portion 52 disposed on both right and left end sides and a central portion 53 disposed between the left portion 51 and the right portion 52. Upper side parts 49ca and 49da of a left edge 49c and a right edge 49d are disposed on the inside in the right and left direction to correspond to the rear parts 47cb and 47db of the left edge 47c and the right edge 47d in the upper panel 47. A notch part (a reference numeral is not provided) configuring the upper recess part 32 and the lower recess part 33 is formed in the central portion 53 of the rear panel 49. The upper panel 47, the lower panel 48, and the rear panel 49 configuring the airbag 15 of the embodiment are formed of a woven cloth of a polyester type, a polyamide type, or the like having flexibility.

The airbag 15 is formed as a bag shape by sewing (coupling) the corresponding edge parts of the upper panel 47. the lower panel 48, and the rear panel 49 with a suture. Specifically, although the illustration is not given in detail, first, the upper edge 49a and the lower edge 49b of the rear panel 49 in a state where the corresponding edge parts of the left portion 51, the central portion 53, and the right portion 52 face each other are sewn in the rear edges 47b and 48b of the upper panel 47 and the lower panel 48 with a suture, respectively. The sewing margin is folded inward in the portion where the upper edge 49a of the rear panel 49 and the rear edge 47b of the upper panel 47 are sewed such that the rear panel 49 and the upper panel 47 is overlapped such that the outer circumferential edges match each other. The upper parts 49ca and 49da of the left edge 49c and the right edge 49d in the rear panel 49 and the rear parts 47cb and 47db of the left edge 47c and the right edge 47d in the upper panel 47 are sewn with a suture, respectively. Next, the upper panel 47 is opened such that the front edge 47a is separated from the rear panel 49, and the remaining outer circumferential edge is overlapped to match the outer circumferential edge of the lower panel 48. The portion of the lower panel 48 from the left edge 48c through the front edge 48a to the right edge 48d is sewn (coupled) in the lower side 49cb in the left edge 49c of the rear panel 49, the front part 47ca in the left edge 47c of the upper panel 47, the front part 47da in the front edge 47a and the right edge 47d, and the lower side 49db in the right edge 49d of the rear panel 49 with a suture, so as to form sewing portion continuously. At the same time, the left coupling portion 37, the right coupling portion 40, the upper recess part 32, and the lower recess part 33 are sewn (coupled) with a suture, thereby producing the airbag 15. Incidentally, in the airbag 15 of the embodiment, the area (including the upper edge and the lower edge and excluding the left edge and the right edge) of the rear wall part 18 which is positioned on the passenger-seat person MP side or the driver MD side at the time of completion of inflation is sewn such that the sewing margin is not exposed outside, and the remaining area is sewn such that the sewing margin is exposed outside (see FIGS. 3 and 4).

Next, the description will be given about a process to mount the occupant protection device M of the embodiment in the vehicle V. First, the airbag 15 is folded to be capable of being housed in the case 12 in a state where the retainers 9L and 9R are inserted therein. Specifically, the upper wall part 16 and the lower wall part 17 are overlapped, and the airbag 15 is folded from the flatly-deployed state such that the upper edge of the rear wall part 18 is directed to the inflow side inflation part 21 side (the front end 15a side of the airbag 15), and the width dimension in longitudinal and lateral directions is reduced such that the airbag 15 can be housed in the case 12. In the embodiment, the airbag 15 is folded to have the reduced width dimension in the front and rear direction such that the rear wall part 18 is roll-folded to be wound from the lower edge side to the lower wall part 17 side, the roll-folded portion is placed on the attachment opening 23, and the area on the front side from the attachment opening 23 is disposed on the front side of the roll-folded portion (see FIG. 1). After folding the airbag 15, the vicinity of the folded airbag 15 is enclosed by a breakable wrapping sheet (not illustrated), so as to prevent folding collapse. Next, the folded airbag 15 is placed on the bottom wall part 12a of the case 12. The main body part 8a of the inflators 8L and 8R is inserted into the case 12 from below the bottom wall part 12a, and the bolt 9a of each of the retainers 9L and 9R protruding downward from the bottom wall part 12a is inserted into the flange part 8c of the inflators 8L and 8R. Thereafter, when the nut 10 is fastened to the bolt 9a protruding from the flange part 8c of the inflators 8L and 8R, the folded airbag 15 and the inflators 8L and 8R can be attached in the case 12. In addition, at that time, in the airbag 15, the circumferential edge portion 24 of the attachment opening 23 (23L, 23R) is attached on the case 12 side by using the inflator 8 (8L, 8R) and the retainer 9 (9L, 9R).

Further, the circumferential wall part 12b of the case 12 is locked in the connection wall part 6c of the airbag cover 6 in the instrument panel 1 mounted in the vehicle V, and the bracket (not illustrated) of the case 12 is fixed on the body side of the vehicle V, whereby the occupant protection device M can be attached in the vehicle V.

Figure 11:
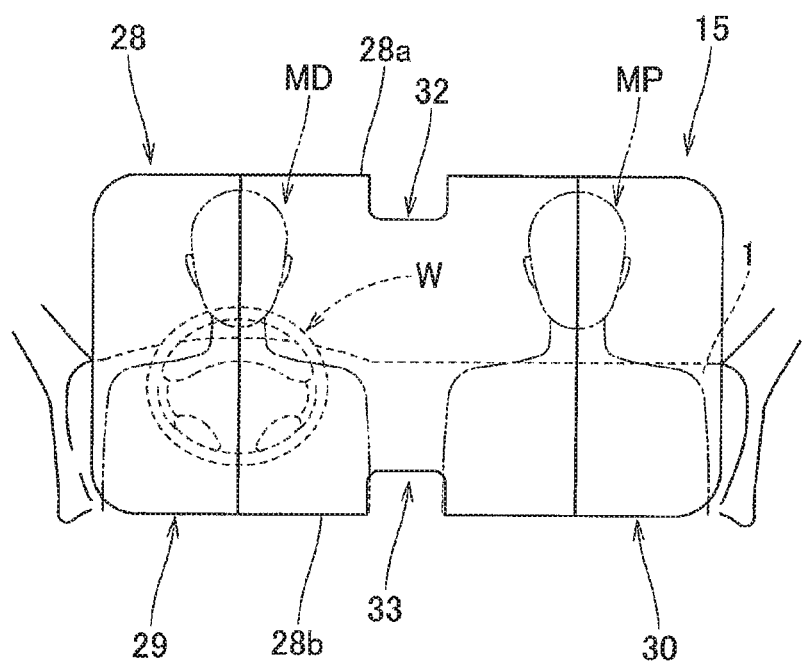
FIG. 11 is a schematic front view illustrating a state where the airbag is inflated completely in the occupant protection device of the embodiment.

In the occupant protection device M of the embodiment, when the inflation gas is discharged from the gas discharge outlet 8b of the inflator 8 (8L, 8R) during the front collision of the vehicle V, the oblique collision, or the offset collision in a state where the occupant protection device is mounted in the vehicle the airbag 15 is inflated by allowing the inflation gas to flow therein, and presses and opens the door parts 6a and 6b of the airbag cover 6. Further, the airbag 15 protrudes upward from the case 12 through the opening which is formed by pressing and opening the door parts 6a and 6b of the airbag cover 6, and is deployed and inflated while protruding to the rear side of the vehicle. As illustrated in FIGS. 11 to 13, the inflation is completed to block a space between the upper surface 2 of the instrument panel 1 and the windshield 4 above the instrument panel 1 and cover the front area from the passenger seat PS to the driver seat DS.

Further, in the occupant protection device M of the embodiment, in the airbag 15, the inflation gas G having flowed in the inflow side inflation part 21 is allowed to flow in the passenger-seat receiving inflation part 30 and the driver-seat receiving inflation part 29 through the two end-side flow path parts 42L and 42R disposed in the end edges (in the case of the embodiment, the left edge 29b in the driver-seat receiving inflation part 29 and the right edge 30c in the passenger-seat receiving inflation part 30) separated in the right and left direction in the passenger-seat receiving inflation part 30 and the driver-seat receiving inflation part 29, and the central flow path part 43 disposed in the proximity edge parts (the right edge 29c in the driver-seat receiving inflation part 29 and the left edge 30b in the passenger-seat receiving inflation part 30) where the passenger-seat receiving inflation part 30 is close to the driver-seat receiving inflation part 29, so as to inflate the passenger-seat receiving inflation part 30 and the driver-seat receiving inflation part 29. For this reason, although the airbag 15 has the passenger-seat receiving inflation part 30 disposed on the front side of the passenger seat PS and the driver-seat receiving inflation part 29 disposed on the front side of the driver seat DS and has the completely inflated shape wide in the right and left direction, the passenger-seat receiving inflation part 30 and the driver-seat receiving inflation part 29 can be inflated rapidly with an excellent balance in the right and left direction. In addition, in the occupant protection device M of the embodiment, the airbag 15 is configured such that the left end 21a and the right end 21b in the inflow side inflation part 21 at the time of completion of inflation is attached in the case 12. Thus, although the inflow side inflation part 21 is disposed continuously substantially along the right and left direction to extend over the front area from the passenger seat PS to the driver seat DS, in other words, is disposed in a rod shape substantially along the right and left direction at the time of completion of inflation, the inflow side inflation part 21 can be disposed to prevent the floating-up of the left end 21a and the right end 21b. Further, in the airbag 15 at the time of completion of inflation, the end-side flow path parts 42L and 42R connect the left end 21a and the right end 21b of the inflow side inflation part 21 with the end edges (left edge 29b, right edge 30c), which are separated in the right and left direction, of the passenger-seat receiving inflation part 30 and the driver-seat receiving inflation part 29, respectively, so as to support the right edge 30c of the passenger-seat receiving inflation part 30 and the left edge 29b of the driver-seat receiving inflation part 29. The central flow path part 43 supports the proximity edge parts (right edge 29c, left edge 30b) where the passenger-seat receiving inflation part 30 is close to the driver-seat receiving inflation part 29. For this reason, in the passenger-seat receiving inflation part 30 and the driver-seat receiving inflation part 29, at the time of completion of inflation of the airbag 15, the left edges 29b and 30b and the right edges 29c and 30c are supported by the end-side flow path parts 42L and 42R and the central flow path part 43 which are inflated in a rod shape substantially along the front and rear direction, respectively. The passenger-seat person MP and the driver MD moving forward can be protected smoothly by the passenger-seat receiving inflation part 30 and the driver-seat receiving inflation part 29 in which the right and left sides are supported.

Therefore, in the occupant protection device M of the embodiment, the increase in volume of the airbag 15 can be prevented, and the passenger-seat person MP and the driver MD can be protected rapidly and smoothly by the airbag 15 inflated completely.

In the occupant protection device M of the embodiment, the airbag 15 includes the opening part 38 which is formed to be penetrated in the vertical direction such that the steering wheel W which is arranged on the front side of the driver seat DS at the time of completion of inflation can be inserted therein. Thus, it can be prevented that the inflating airbag 15 interferes with the steering wheel W while the airbag 15 is deployed and inflated, and the airbag 15 can be inflated more rapidly and smoothly. In addition, the volume of the airbag 15 itself can be reduced by providing the opening part 38, compared to a case where the opening part is not included. Incidentally, if such a point is not taken into consideration, the airbag may not include the opening part for insertion of the steering wheel, but include a sheet-shaped portion which covers the upper side of the steering wheel at the time of completion of inflation for example.

In the occupant protection device M of the embodiment, on the front side of the passenger-seat receiving inflation part 30, the airbag 15 includes the right coupling portion 40 as a non-inflation area, in which the inflation gas does not flow therein, in the area between the end-side flow path part 42R and the central flow path part 43. Thus, it is possible to reduce the volume of the airbag 15. Incidentally, if such a point is not taken into consideration, the airbag may be configured such that the non-inflation area is arranged on the front side of the passenger-seat receiving inflation part. In the airbag 15 of the embodiment, the left coupling portion 37 and the right coupling portion 40 which are formed by contacting and sewing the upper wall part 16 and the lower wall part 17 are formed in the area between the occupant protection part 28 (the driver-seat receiving inflation part 29 and the passenger-seat receiving inflation part 30) and the inflow side inflation part 21. The end-side flow path parts 42L and 42R and the central flow path part 43 are configured from the area of the gap between the left coupling portion 37 and the right coupling portion 40, between the left coupling portion 37 and the left edge 15c, and between the right coupling portion 40 and the right edge 15d. For this reason, the increase in volume of the airbag 15 can be prevented extremely, and the end-side flow path parts 42L and 42R and the central flow path part 43 can be formed. In a case where the airbag is configured such that the non-inflation area is not arranged, for example, the area between the end-side flow path part and the central flow path part may be connected by a tether which regulates the separation distance of the upper wall part and the lower wall part. In addition, an additional cylindrical inner tube may be provided in the airbag, and the end-side flow path part and the central flow path part may be configured by the inner tube.

In the occupant protection device M of the embodiment, the passenger-seat receiving inflation part 30 and the driver-seat receiving inflation part 29 are configured such that the rear surfaces 29a and 30a at the time of completion of inflation are connected continuously in the right and left direction. Thus, during the oblique collision of the vehicle V or the offset collision, in a case where the passenger-seat person MP or the driver MD moves obliquely to the front side as the central side in the right and left direction, the passenger-seat person MP or the driver MD which moves obliquely to the front side can be accurately protected by the portion (the rear surface 34a of the communication part 34) between the passenger-seat receiving inflation part 30 and the driver-seat receiving inflation part 29. Incidentally, if such a point is not taken into consideration, the airbag may be configured in a state where the passenger-seat receiving inflation part and the driver-seat receiving inflation part are separated in the right and left direction.

In the embodiment, the passenger-seat receiving inflation part 30 and the driver-seat receiving inflation part 29 communicate with each other through the communication part 34. In other words, the inflation area which is inflated by allowing the inflation gas to flow therein is configured to be continuous in the right and left direction, and thus the passenger-seat person MP or the driver MD which moves obliquely to the front side can be protected more accurately with good cushioning performance by the communication part 34 which is inflated by allowing the inflation gas to flow therein. Incidentally, if such a point is not taken into consideration, as the airbag 15A is illustrated in FIGS. 14 and 15, the occupant protection part 28A may be configured such that the passenger-seat receiving inflation part 30A and the driver-seat receiving inflation part 29A are separated in the right and left direction, and an additional connection cloth 56 is disposed to connect the passenger-seat receiving inflation part 30A and the driver-seat receiving inflation part 29A, so as to block the gap between the passenger-seat receiving inflation part 30A and the driver-seat receiving inflation part 29A.

Figure 14:
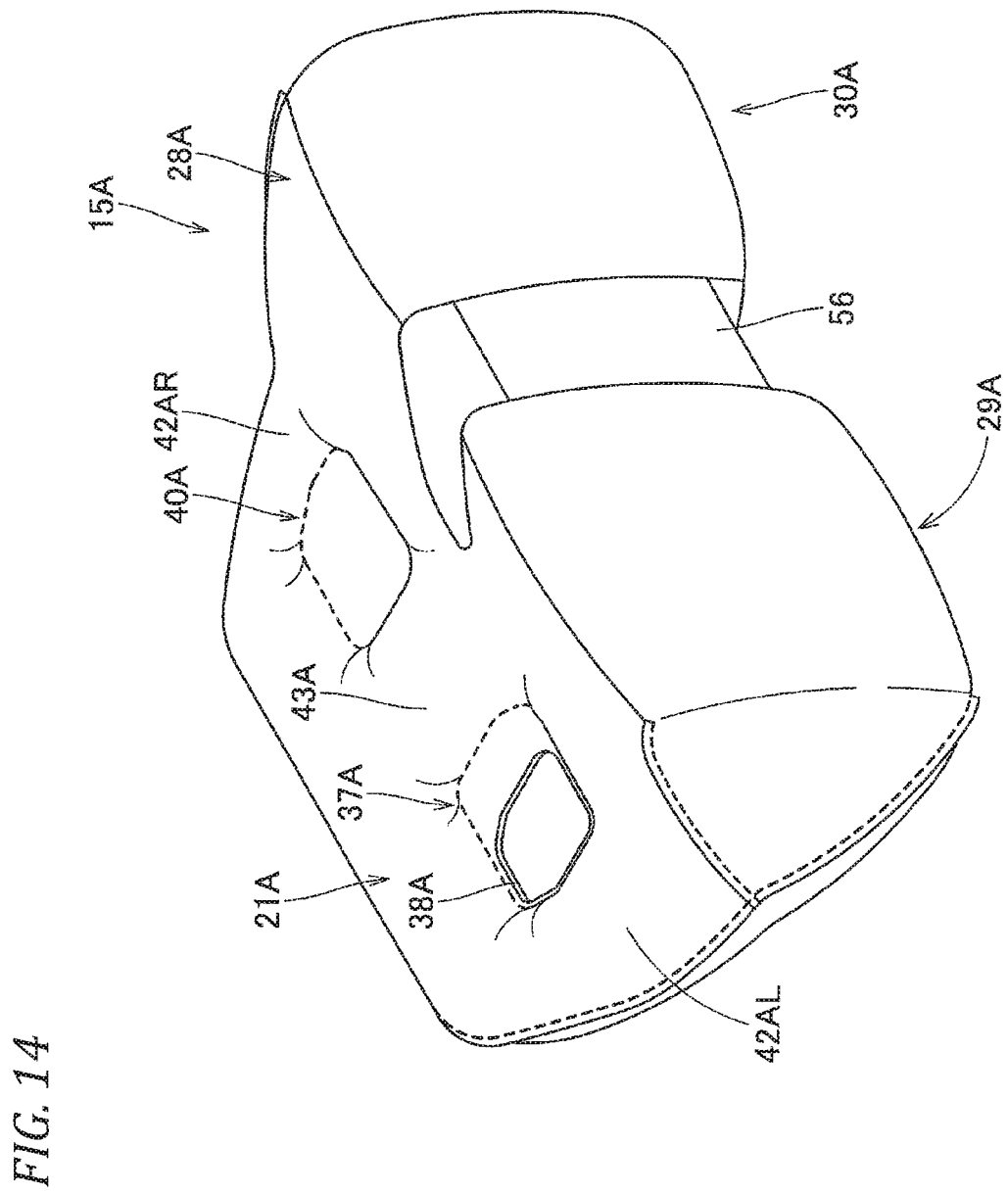
FIG. 14 is a perspective view illustrating a state where an airbag of another embodiment of the invention is inflated in a single piece when viewed from a rear right side.
Figure 15:
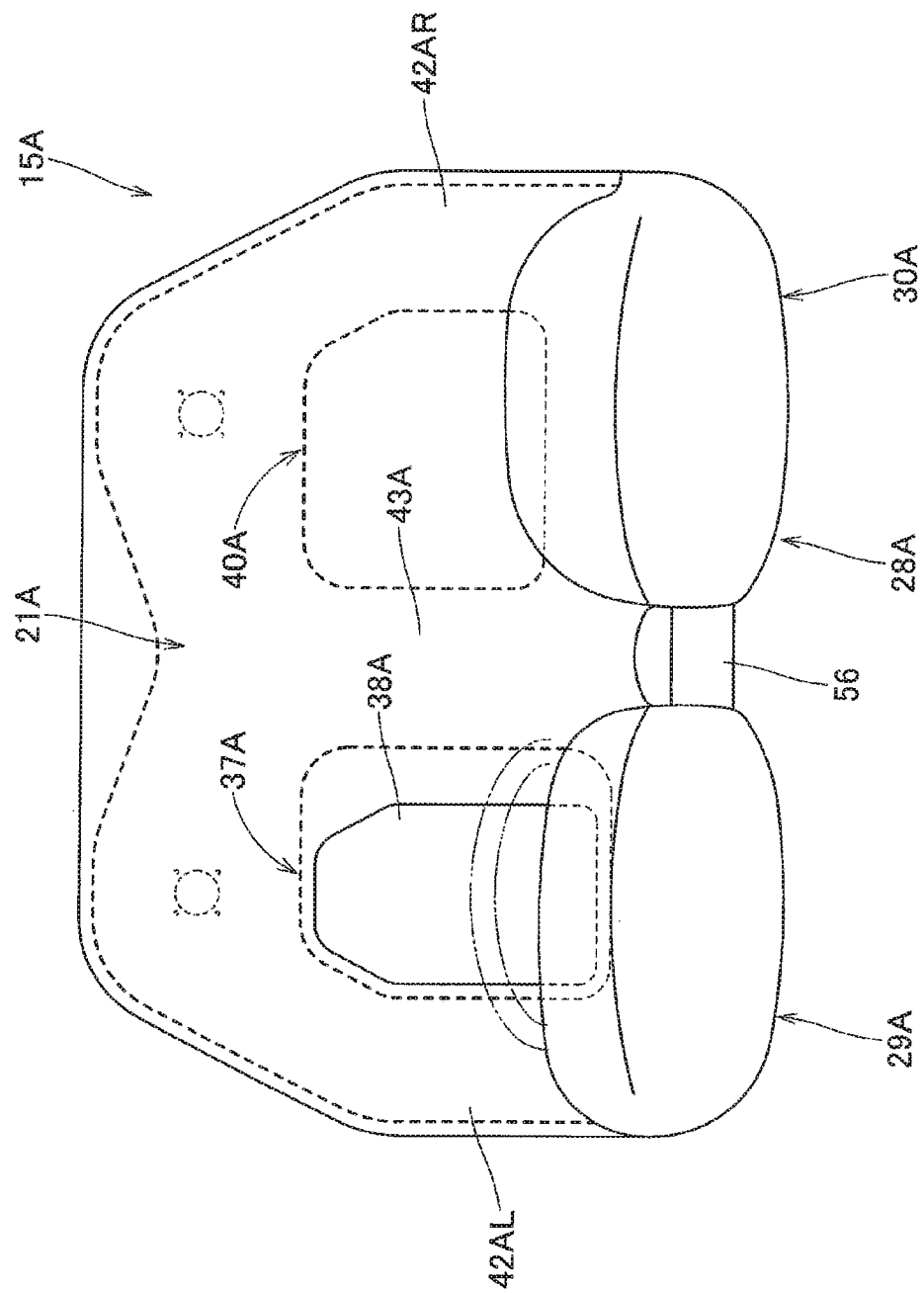
FIG. 15 is a plan view illustrating a state where the airbag of FIG. 14 is inflated in a single piece.
Figure 16:
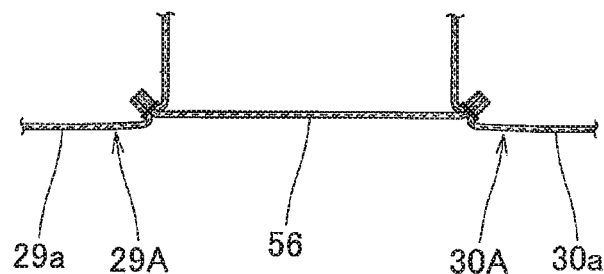
FIG. 16 is a partially enlarged lateral sectional view illustrating a portion of a connection cloth in the airbag of FIG. 14.

In the airbag 15A, as illustrated in FIGS. 14 to 16, the occupant protection part 28A includes the passenger-seat receiving inflation part 30A and the driver-seat receiving inflation part 29A which are separated over the vertically entire area in the right and left direction and the connection cloth 56 which connects the passenger-seat receiving inflation part 30A and the driver-seat receiving inflation part 29A in the rear surfaces 29a and 30a. In the embodiment, in the connection cloth 56, the width dimension in the vertical direction is set to be slightly smaller than the vertically width dimension of the passenger-seat receiving inflation part 30A and the driver-seat receiving inflation part 29A. The passenger-seat receiving inflation part 30A and the driver-seat receiving inflation part 29A are configured such that the rear surfaces 29a and 30a at the time of completion of inflation are connected continuously in the right and left direction through the connection cloth 56 at the time of completion of inflation. For this reason, although the passenger-seat receiving inflation part 30A and the driver-seat receiving inflation part 29A are configured to be separated over the vertically entire area in the right and left direction, the passenger-seat person MP or the driver MD which moves obliquely to the front side can be accurately protected by the connection cloth 56 or the area in the vicinity of the connection cloth 56.

Figure 17:
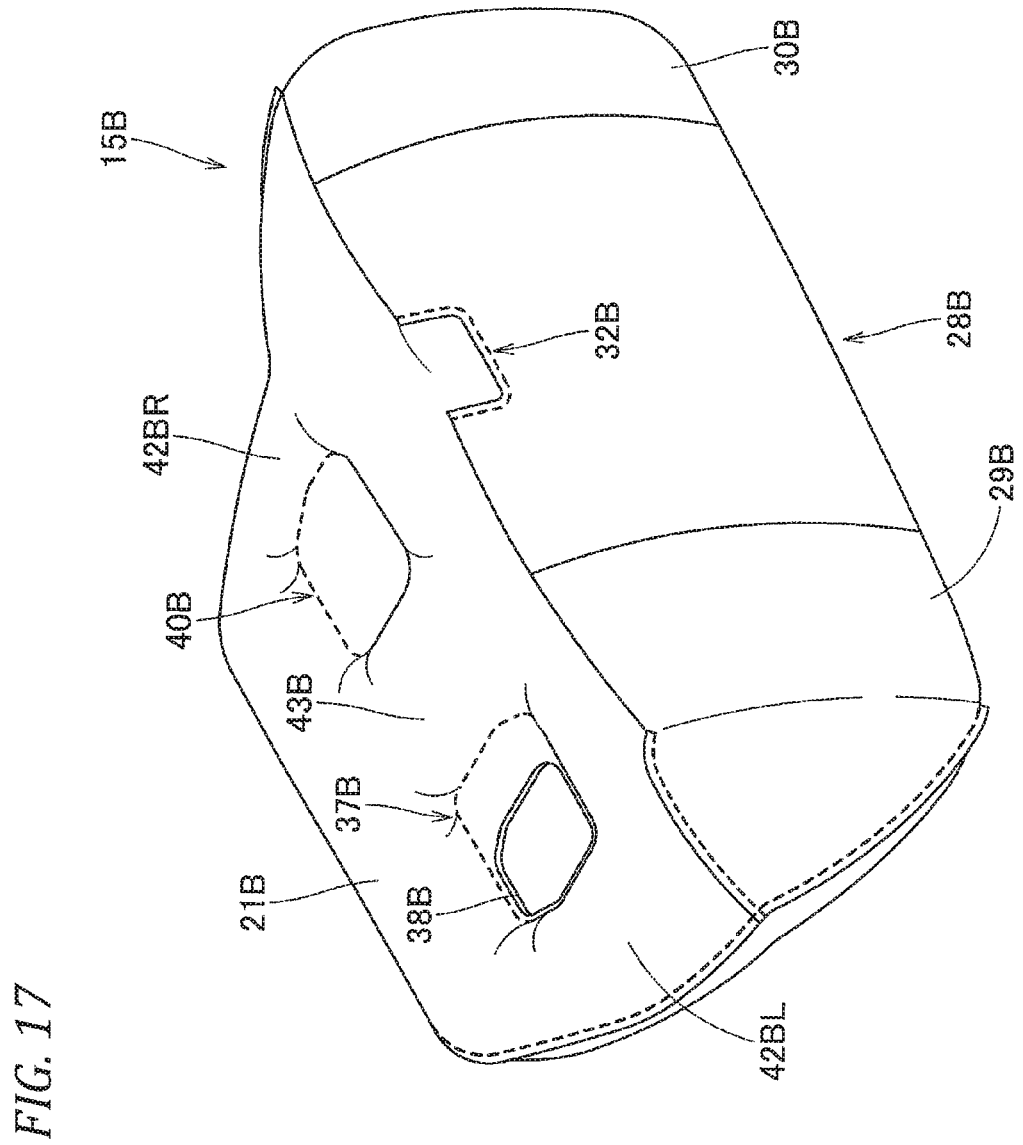
FIG. 17 is a perspective view illustrating a state where an airbag of still another embodiment of the invention is inflated in a single piece when viewed from the rear right side.

In the airbag 15 of the embodiment, the occupant protection part 28 is configured such that the upper recess part 32 and the lower recess part 33 are arranged in the upper edge 28a and the lower edge 28b. However, in such recess parts, only the upper recess part 32B may be provided like an airbag 15B illustrated in FIG. 17, and further the recess parts may not be provided.

Figure 18:
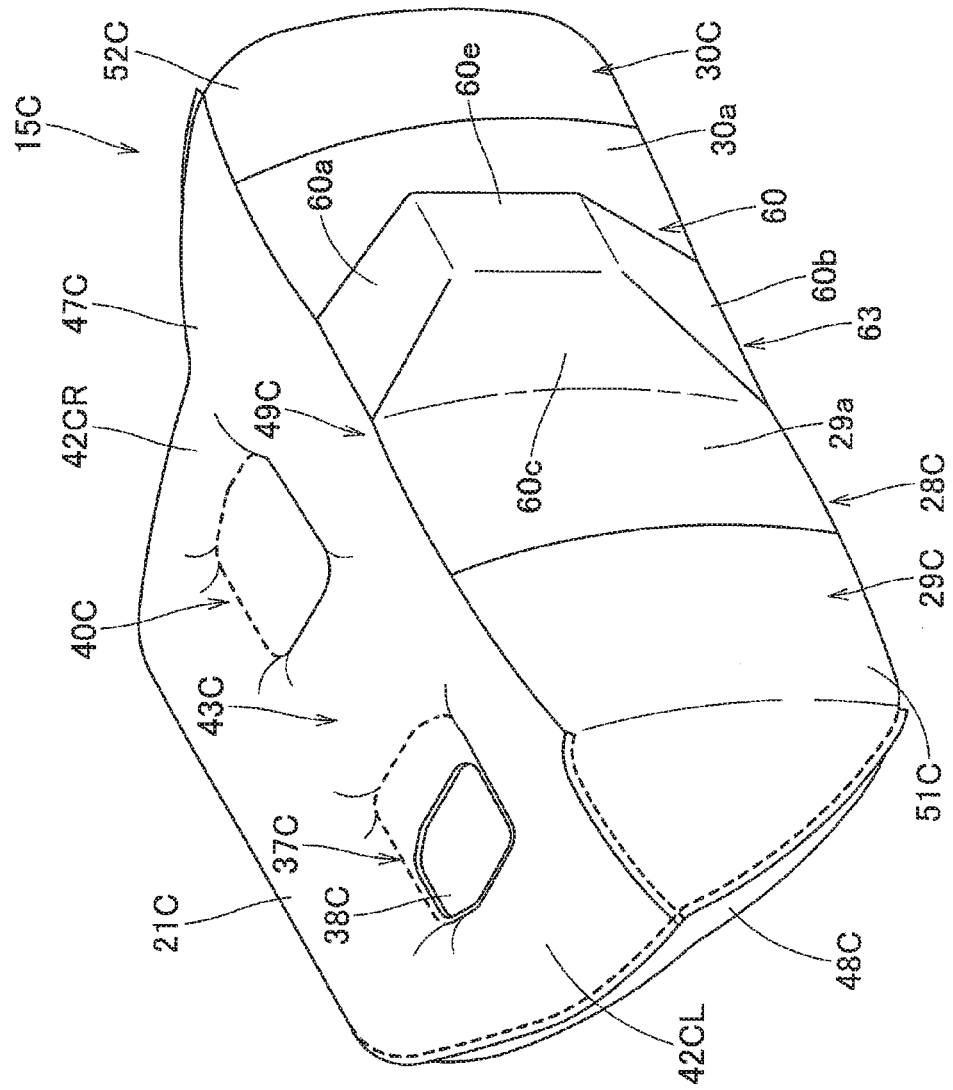
FIG. 18 is a perspective view illustrating a state where an airbag of still further another embodiment of the invention is inflated in a single piece when viewed from the rear right side.

An airbag 15C may be configured as illustrated in FIG. 18. In the airbag 15C, the occupant protection part 28C includes a protrusion inflation part 60 which is disposed between the passenger-seat receiving inflation part 30C and the driver-seat receiving inflation part 29C to protrude rearward at the time of completion of inflation. The airbag 15C has the same configuration as the above-described airbag 15 except that the protrusion inflation part 60 is included. The same members are denoted at the end of the same reference numerals by "C", and the detailed description is not given.

Figure 19:
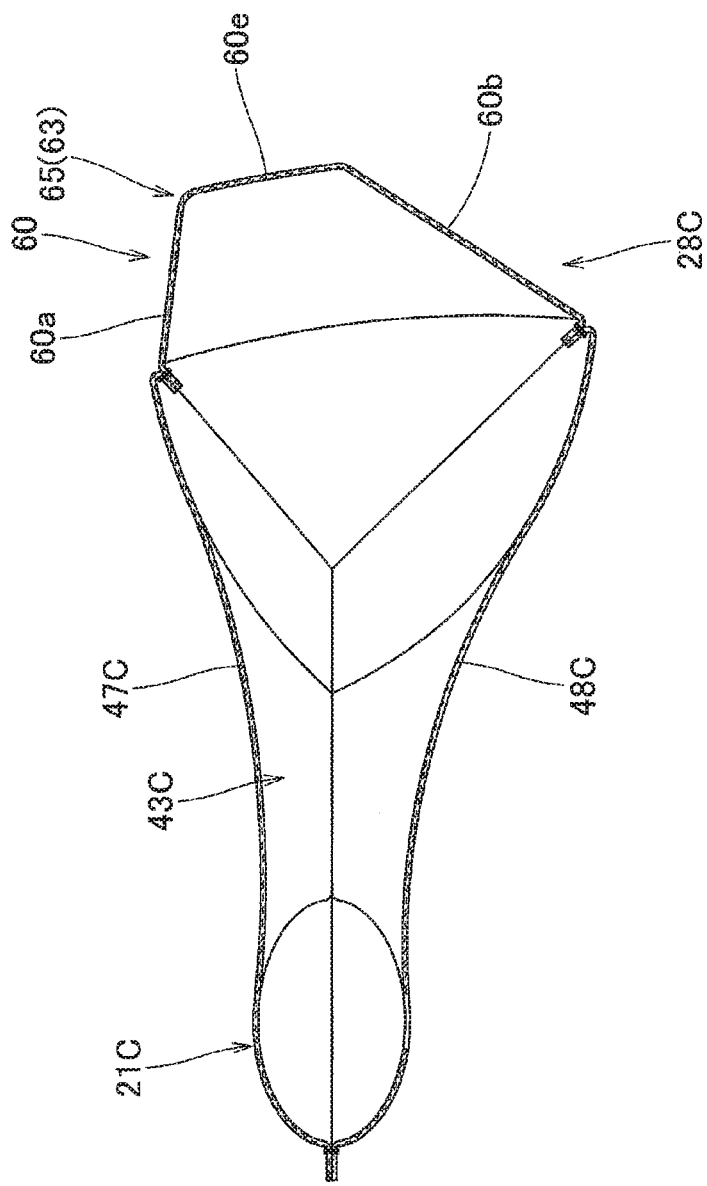
FIG. 19 is a schematic longitudinal sectional view illustrating a portion of a protrusion inflation part in the airbag of FIG. 18.
Figure 20:
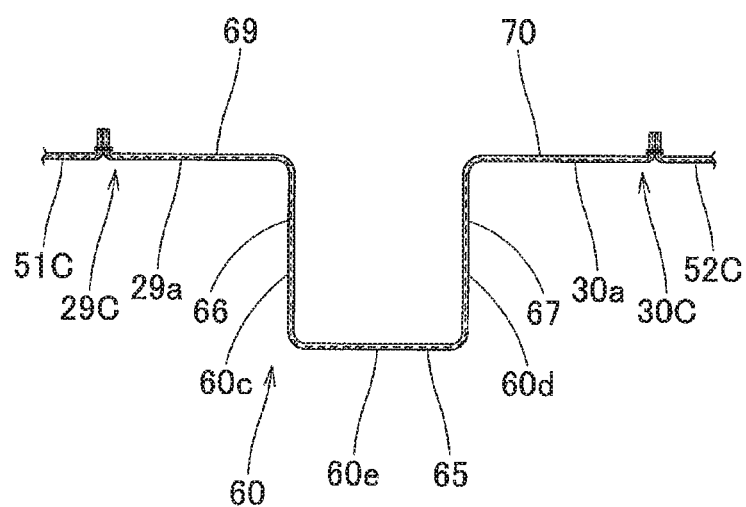
FIG. 20 is a partially enlarged lateral sectional view illustrating the portion of the protrusion inflation part in the airbag of FIG. 18.
Figure 22:
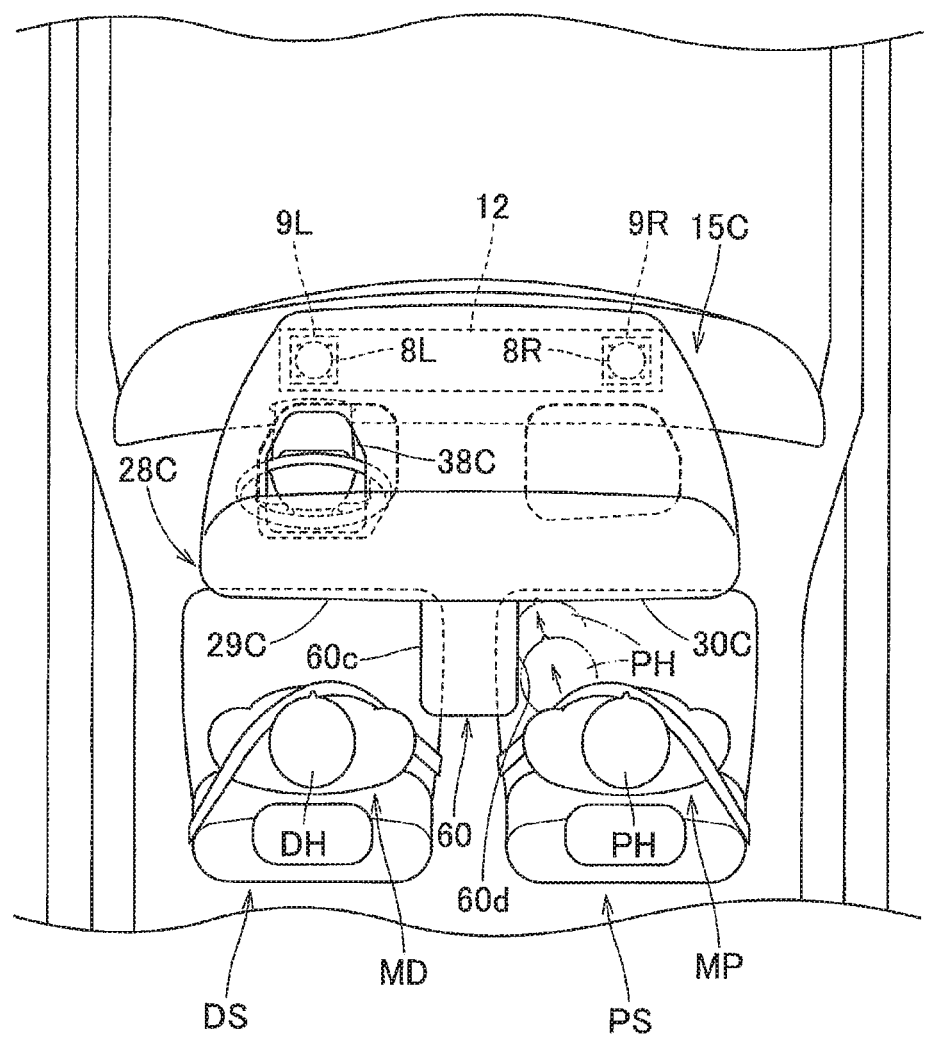
FIG. 22 is a schematic plan view illustrating a state where the airbag is inflated completely in the occupant protection device using the airbag of FIG. 18.

In a position which is the approximate center of the occupant protection part 28C in the right and left direction between the passenger-seat receiving inflation part 30C and the driver-seat receiving inflation part 29C, the protrusion inflation part 60 is disposed to be connected from the rear surfaces 29a and 30a of the passenger-seat receiving inflation part 30C and the driver-seat receiving inflation part 29C and to protrude rearward. The outer shape at the time of completion of inflation is configured to have a trapezoidal shape in which the rear end side is narrow when viewed from the right and left direction, and have an almost constant width dimension in the right and left direction (see FIGS. 19 and 20), The protrusion inflation part 60 is configured such that head parts PH and DH of the passenger-seat person MP and the driver MD are received by a left wall part 60c and a right wall part 60d which are disposed to face each other in the right and left direction at the time of completion of inflation. As illustrated in FIG. 22, the left wall part 60c and the right wall part 60d are configured to be disposed substantially along the front and rear direction at the time of completion of inflation of the airbag 15C. Further, as illustrated in FIG. 19, when viewed from the right and left direction, the amount in which the upper end area arranged in the head parts PH and DH of the passenger-seat person MP or the driver MD protrudes rearward is set to be the most, and the protrusion inflation part 60 is converged toward the lower end side. In the protrusion inflation part 60, the amount in which the area on the upper end side protrudes rearward is set to be such that the head parts PH and DH can be smoothly restrained when the head parts PH and DH of the passenger-seat person MP and the driver MD which move obliquely to the front side which is the central side in the right and left direction are received by the left wall part 60c and the right wall part 60d during the oblique collision of the vehicle V or the offset collision. Specifically, as illustrated in FIG. 22, in the airbag 15C, during the oblique collision of the vehicle V or the offset collision, the head part PH of the passenger-seat person MP which moves obliquely leftward to the front side is received by the right wall part 60d of the protrusion inflation part 60, is guided by the right wall part 60d to move to the front side, and is restrained by the portion near the boundary between the passenger-seat receiving inflation part 30 and the protrusion inflation part 60.

The upper panel 47C, the lower panel 48C, and the rear panel 49C which configure the airbag 15C have the same configuration as the above-described airbag 15 except for a central portion 63 which configures the protrusion inflation part 60 in the rear panel 49C. The same members are denoted at the end of the same reference numerals by "C", and the detailed description is not given.

Figure 21:
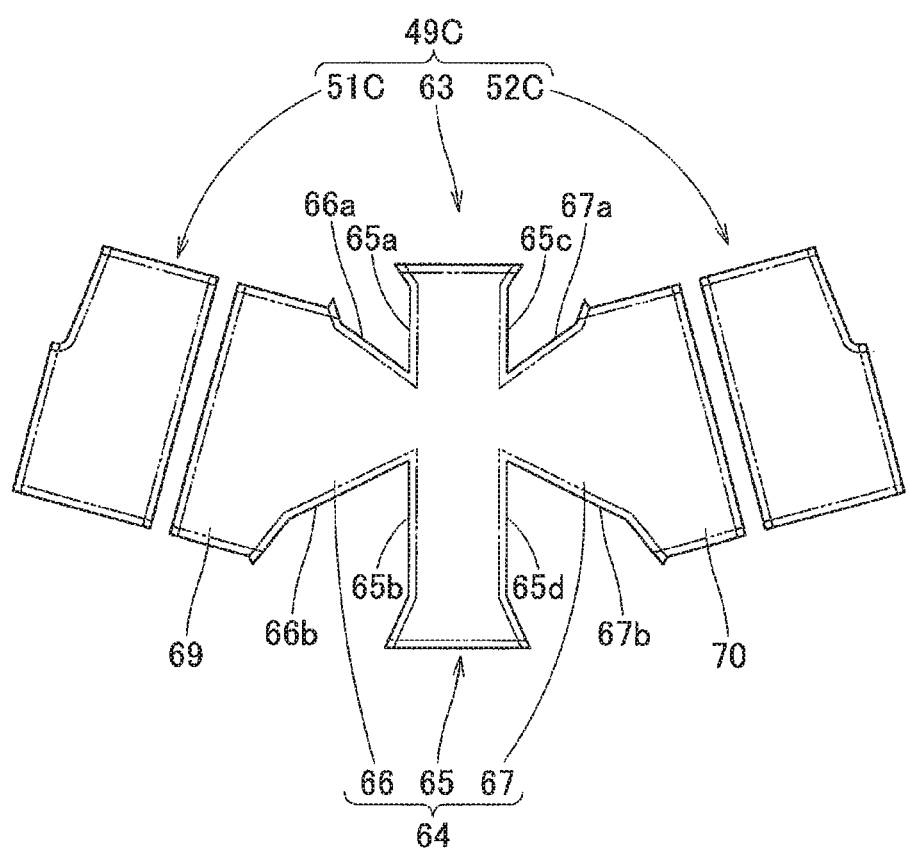
FIG. 21 is a plan view illustrating a central portion configuring a rear panel configuring the airbag of FIG. 18.

As illustrated in FIG. 21, the central portion 63 includes a protrusion forming portion 64 which is disposed on the central side in the right and left direction to configure the protrusion inflation part 60, a center left portion 69 which configures the right area in the rear surface 29a of the driver-seat receiving inflation part 29, and a center right portion 70 which configures the left area in the rear surface 30a of the passenger-seat receiving inflation part 30. In each of the center left portion 69 and the center right portion 70, the outer shape is formed in an almost rectangular shape.

The protrusion forming portion 64 includes a belt portion 65 which is disposed on the central side in the right and left direction and configures the area of the protrusion inflation part 60 from the upper wall part 60a through the rear wall part 60e to the lower wall part 60b, and side-wall configuring portions 66 and 67 which are formed to protrude to both right and left sides from the position which is the slightly upper side from the vertically center of the flatly-deployed belt portion 65 and configure the left wall part 60c and the right wall part 60d. The side-wall configuring portions 66 and 67 are configured to be connected to the center left portion 69 and the center right portion 70, and are configured in a substantially trapezoidal shape which is widely open to the center left portion 69 and the center right portion 70. The protrusion forming portion 64 has a symmetrical shape. Further, in the protrusion forming portion 64, an upper left edge 65a of the belt portion 65 and an upper edge 66a of a left side-wall configuring portion 66, a left lower edge 65b of the belt portion 65 and a lower edge 66b of the left side-wall configuring portion 66, an upper right edge 65c of the belt portion 65 and an upper edge 67a of the right side-wall configuring portion 67, and a lower right edge 65d of the belt portion 65 and a lower edge 67b of the right side-wall configuring portion 67 are sewn (coupled) with a suture to configure the protrusion inflation part 60. Incidentally, even in the airbag 15C having such a configuration, the area of the protrusion inflation part 60 Which is positioned on the passenger-seat person MP side or the driver MD side is sewn such that the sewing margin is not exposed outside at the time of completion of inflation.

In a case where the airbag 15C having such a configuration is used, during the oblique collision of the vehicle or the offset collision, the passenger-seat person MP or the driver MD which moves obliquely to the front side which is the central side in the right and left direction can be protected more accurately by the protrusion inflation part 60 which is disposed to protrude rearward between the passenger-seat receiving inflation part 30C and the driver-seat receiving inflation part 29C.

In the occupant protection device M of the embodiment, the left end 21a and the right end 21b of the inflow side inflation part 21 are fixed in the case 12 by using the inflators 8L and 8R, and thus an attachment member for attaching the inflow side inflation part 21 in the case 12 also can be used in the retainer 9 as an attachment member for attaching the inflator 8 in the case 12. Therefore, it can be prevented that the number of the components or the number of the attaching processes is increased. In addition, although the airbag 15 is configured to be wide in the right and left direction to cover the front area from the passenger seat PS to the driver seat DS, by arranging the inflators 8L and 8R at two places on the both right and left end sides, the airbag 15 can be inflated rapidly with an excellent balance in the right and left direction. Incidentally, if such a point is not taken into consideration, the inflator may be configured to be disposed not in the both right and left end sides of the inflow side inflation part, but only in one place which is the approximate center in the right and left direction. In that case, in the inflow side inflation part, the central side in the right and left direction is attached by the inflator in the case, and the both right and left end sides are attached in the case by an additional attachment member.

Particularly, in the occupant protection device M of the embodiment, a disc-type inflator is used as the inflator 8. The circumferential edge portion of the attachment opening 23 which is formed in the lower wall part 17 of the inflow side inflation part 21 of the airbag 15 is configured to be attached in the case 12 by the retainer 9 which fixes the inflator 8 in the case 12. That is, in the occupant protection device M of the embodiment, the circumferential edge portion 24 of the attachment opening 23 formed in the inflow side inflation part 21 is pressed in a form of plane by using the retainer 9 to attach the inflow side inflation part 21 in the case 12.

Thus, the inflow side inflation part 21 can be attached in the case 12 over a wider surface compared to a case where a cylinder-type inflator is used. Incidentally, if such a point is not taken into consideration, the cylinder-type inflator may be used. The cylinder-type inflator is connected in the airbag in such a manner that the attachment member (bolt) and the like for attachment in the case is made protrude and be housed in the airbag, or a cylindrical inflow port formed to protrude from the airbag is connected by using a connection unit such as a clamp.

What is claimed is:
1. An occupant protection device, comprising:
an airbag which is housed in a folded state in a housing portion provided in an instrument panel disposed on a front side of a front seat in a vehicle and is inflated by allowing an inflation gas discharged from an inflator to flow therein, wherein:
the airbag is configured to be disposed to cover a front area from a passenger seat to a driver seat at the time of completion of inflation;
the housing portion is arranged over the front area from the passenger seat to the driver seat to house the folded airbag;
the airbag includes:
a passenger-seat receiving inflation part which is disposed on a front side of the passenger seat and is inflated to receive a passenger-seat person;
a driver-seat receiving inflation part which is disposed on a front side of the driver seat and is inflated to receive a driver;
an inflow side inflation part which is formed continuously substantially along a right and left direction on a front area from the passenger-seat receiving inflation part to the driver-seat receiving inflation part and is inflated by allowing the inflation gas discharged from the inflator to flow therein;
an end-side flow path part which is configured to be disposed substantially along a front and rear direction at the time of completion of inflation so that both ends of the inflow side inflation part in the right and left direction are respectively connected with end edges, which are separated in the right and left direction at the time of completion of inflation, of the passenger-seat receiving inflation part and the driver-seat receiving inflation part, and to support the end edges, which are separated in the right and left direction, of the passenger-seat receiving inflation part and the driver-seat receiving inflation part at the time of completion of inflation by allowing the inflation gas having flowed in the inflow side inflation part to flow out to the passenger-seat receiving inflation part and the driver-seat receiving inflation part; and
a central flow path part which is configured to be disposed substantially along the front and rear direction at the time of completion of inflation on the area between the end-side flow path parts so that the inflow side inflation part is connected with a proximity edge part where the passenger-seat receiving inflation part is close to the driver-seat receiving inflation part, and to support the proximity edge parts in the passenger-seat receiving inflation part and the driver-seat receiving inflation part at the time of completion of inflation by allowing the inflation gas having flowed in the inflow side inflation part to flow out to the pas- senger-seat receiving inflation pail and the driver-seat receiving inflation part; and the inflow side inflation part is configured so that at least both right and left end sides at the time of completion of inflation are attached in the housing portion.

2. The occupant protection device according to claim 1, wherein the airbag has an opening part which is formed to be penetrated vertically so that a steering wheel arranged on the front side of the driver seat is insertable therethrough at the time of completion of inflation.

3. The occupant protection device according to claim 1, wherein the airbag has a non-inflation area which does not allow the inflation gas to flow therein, in an between the end-side flow path part and the central flow path part on the front side of the passenger-seat receiving inflation part.

4. The occupant protection device according to claim 1, wherein the passenger-seat receiving inflation part and the driver-seat receiving inflation part are configured so that rear surfaces at the time of completion of inflation are connected continuously in the right and left direction.

5. The occupant protection device according to claim 4, wherein the passenger-seat receiving inflation part and the driver-seat receiving inflation part are configured so that inflation areas which are inflated by allowing the inflation gas to flow in the inflation area are continuous in the right and left direction.

6. The occupant protection device according to claim 1, wherein a protrusion inflation part which is disposed to protrude rearward at the time of completion of inflation is arranged between the passenger-seat receiving inflation part and the driver-seat receiving inflation part.

7. The occupant protection device according to claim 1, wherein:

the inflator is arranged on the both right and left end sides of the inflow side inflation part at the time of completion of inflation; and the inflow side inflation part is attached in the housing portion by using the two inflators.

8. The occupant protection device according to claim 7, wherein:

the inflator is configured as a disc type; and the inflow side inflation part has an attachment opening in which the inflator is insertable in a lower wall part disposed in a lower surface at the time of completion of inflation, and a circumferential edge of the attachment opening is attached in the housing portion by using a retainer which fixes the inflator in the housing portion.

* * * * *